United States Patent [19]
Paoli

[11] Patent Number: 5,995,267
[45] Date of Patent: Nov. 30, 1999

[54] TIME DIVISION MULTIPLEXING MULTIPLE BEAM RASTER OUTPUT SCANNING SYSTEM

[75] Inventor: Thomas L. Paoli, Los Altos, Calif.

[73] Assignee: Xerox Corporation, Stamford, Conn.

[21] Appl. No.: 09/016,691

[22] Filed: Jan. 30, 1998

[51] Int. Cl.[6] .................................................. G02B 26/08
[52] U.S. Cl. .......................... 359/204; 359/196; 347/233; 347/243
[58] Field of Search ..................................... 359/196, 197, 359/204; 347/233, 243

[56] References Cited

U.S. PATENT DOCUMENTS

| | | |
|---|---|---|
| 5,243,359 | 9/1993 | Fisli . |
| 5,343,224 | 8/1994 | Paoli . |
| 5,371,526 | 12/1994 | Appel et al. . |
| 5,784,094 | 7/1998 | Ota et al. ................................. 347/243 |
| 5,850,307 | 12/1998 | Straayer .................................. 359/196 |
| 5,883,731 | 3/1999 | Kasai ....................................... 359/204 |

Primary Examiner—Cassandra Spyrou
Assistant Examiner—Darren E. Schuberg
Attorney, Agent, or Firm—William Propp

[57] ABSTRACT

A time division multiplexed laser emits two beams of the same wavelength but orthogonal polarization or two beams of different wavelengths from a single laser source for use in a multiple beam raster output scanning system. The multiple beam raster output scanning is obtained from a single raster scanning system (ROS) with a rotating mirror, beneficially a polygon mirror, and a single set of scan optics for use in single or multiple station printers. A plurality of the coaxially overlapping laser beams from the same laser source are deflected using a common mirror surface area and laser beams containing different channels of data signals are subsequently separated by a plurality of dynamic and static beam separators based on polarization or wavelength. The channels of the separated laser beams are directed onto associated photoreceptors.

64 Claims, 11 Drawing Sheets

TIME DIVISION MULTIPLEXING MULTIPLE BEAM RASTER OUTPUT SCANNING SYSTEM

BACKGROUND OF THE INVENION

This invention relates to a multiple beam raster output scanning system and, more particularly, to a multiple beam raster output scanning system with time division multiplexing lasers and dynamic beam separators.

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image onto a recording medium, usually plain paper.

Typically, a laser beam is deflected from a rotating mirror to sweep the beam across the photoreceptor. The rotating polygon mirror and related optics are generally referred to as Raster Output Scanners (ROSs). Printers that sweep several beams simultaneously are referred to as multiple beam printers.

Problems arise in xerographic printing when attempting to print at high speed, particularly when printing in color.

A color xerographic printer requires a separate image for each color printed, hereinafter called a system color. While a dual color printer requires only two images, a full color printer typically requires four images, one for each of the three primary colors of cyan, magenta, yellow, and an additional one for black. Color prints are currently produced by sequentially transferring and fusing overlapped system colors onto a single recording medium which is passed multiple times, once for each system color, through the printer. Such printers are referred to as multiple pass printers.

Multiple colors can be imprinted on a recording medium in one pass through the system by using a sequence of xerographic stations, one for each system color. If each station is associated with a separate photoreceptor, the printer is referred to as a multistation printer.

One example of multistation xerographic systems has a printer having multiple recording stations and multiple lens systems but a single shared ROS with only one rotating polygon mirror. The plurality of beams from the laser source are spatially overlapped using an optical beam combiner. The overlapped beams are then deflected using a single polygon mirror and the deflected beams are separating using an optical filter (and polarizers if more than two beams are used). The separated beams are directed onto associated photoreceptors.

One such multiple beam, single ROS xerographic printing system is disclosed in U.S. Pat. No. 5,243,359, commonly assigned as the present application and herein incorporated by reference. A raster output scanning system employs a rotating polygon mirror that simultaneously deflects a plurality of clustered, dissimilar wavelength laser beams having common optical axes and substantially common origins from common mirror surface areas. The clustered beams are subsequently separated by a plurality of static optical filters and are then directed onto associated photoreceptors of a multistation printer.

Another such multiple beam, single ROS xerographic printing system is disclosed in U.S. Pat. No. 5,343,224, commonly assigned as the present application and herein incorporated by reference. A raster output scanning system employs a rotating polygon mirror that simultaneously deflects a plurality of clustered, dissimilar wavelengths, dissimilar polarization state laser beams having common optical axes and substantially common origins from common mirror surface areas. The clustered beams are subsequently separated by a plurality of static polarization filters and are then directed onto associated photoreceptors of a multistation printer.

A combination of a multiple wavelength laser and post-emission polarizers presents still a third multiple beam, single ROS xerographic printing system, disclosed in U.S. Pat. No. 5,371,526, commonly assigned as the present application and herein incorporated by reference. A raster output scanning system employs a rotating polygon mirror that simultaneously deflects a plurality of clustered, dissimilar wavelength, dissimilar polarization state laser beams having common optical axes and substantially common origins from common mirror surface areas. The clustered beams are subsequently separated by a plurality of static optical filters and static polarization filters and are then directed onto associated photoreceptors of a multistation printer.

However, under all three prior art multiple beam, single ROS xerographic printing systems, at least one laser is required for each position or station. Thus, printing at four stations requires an array of four lasers, each with a different wavelength or polarization state. As the printing speed increases, larger arrays are needed for the multiple beam raster output scanning system in order to simultaneously expose each station with more than one beam. For example, dual beam printing at each of four stations requires eight lasers and quadbeam printing at each of four stations requires 16 lasers.

This progression shows that the number of lasers and therefore the physical size of the laser array becomes increasingly large leading to increasingly complex construction of the semiconductor laser array structure and to increasingly complex scanning optics to separate and locate the beams on the stations.

An architecture is needed for reducing the number of different lasers in a multiple beam, single ROS xerographic printing system. Similarly, an architecture is needed for a multiple beam, single ROS xerographic printing system in which the number of printing stations and laser beams used to print at each station is straightforwardly extensible.

It is an object of this invention to provide a multiple beam raster output scanning system with time multiplexed lasers and dynamic beam separators.

SUMMARY OF THE INVENTION

A time division multiplexed laser emits two beams of the same wavelength but orthogonal polarization or two beams of different wavelengths from a single laser source for use in a multiple beam raster output scanning system. The multiple beam raster output scanning is obtained from a single raster scanning system (ROS) with a rotating mirror, beneficially a polygon mirror, and a single set of scan optics for use in single or multiple station printers. A plurality of the coaxially overlapping laser beams from the same laser source are deflected using a common mirror surface area and laser beams containing different channels of data signals are subsequently separated by a plurality of dynamic and static beam separators based on polarization or wavelength. The channels of the separated laser beams are directed onto associated photoreceptors.

A time division multiplexed laser emits a single beam in a multiple beam raster output scanning system that separates different channels of data signals by a plurality of dynamic beam separators. The channels of the separated laser beams are directed onto associated photoreceptors.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
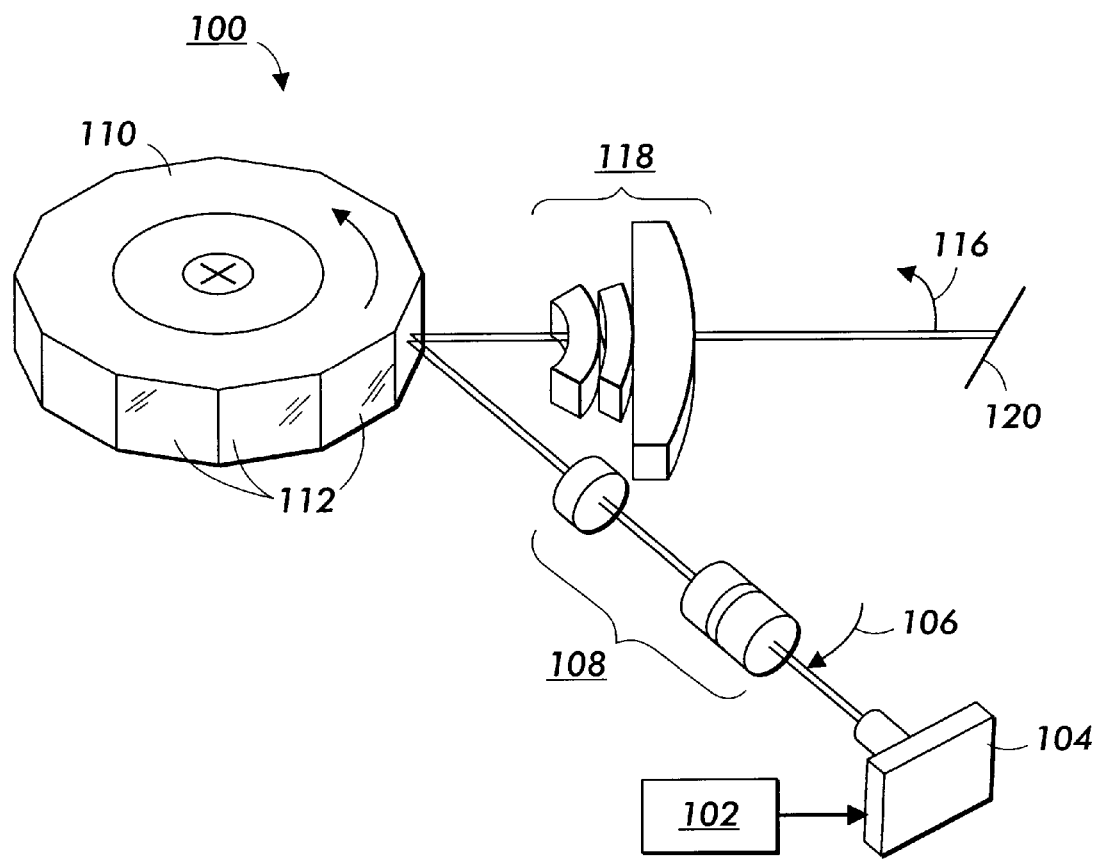
FIG. 1 is a schematic illustration of a multiple beam raster output scanner (ROS) with time division multiplexing used in the various illustrated embodiments of the present invention.

Time division multiplexing or time multiplexing is a method of obtaining a number of channels over a single optical pulse signal by dividing the optical pulse signal into a number of time slots and assigning each channel its own intermittently repeated time slot within a duty cycle. Synchronizing information is added to define the starting and ending time of a slot within the duty cycle. An address is added to identify the time slot. Then the data signal stream from the different channels are put into the time slots and the optical pulse signal is transmitted. The signal is separated at the receiving end where each channel is reassembled Thus, more than one signal can be sent over a single channel by using different time intervals for the different signals.

A perspective, schematic view of the basic raster output scanner 100 as used in the illustrated embodiments of the present invention is described with reference to FIG. 1. Raster output scanner 100 includes an electronic signal multiplexer 102 for inputting a time division multiplexed signal to a laser source 104 that outputs multiple, time division multiplexed signal modulated laser beams 106 (two beams shown in FIG. 1) from a substantially common spatial location. For purposes of clarity, only the chief rays are shown. Each beam is independently modulated from the electronic signal multiplexer 102 with data appropriate to expose a photoreceptive element in accordance with a desired image. An input optical system 108 serves to direct laser beams 106 onto overlapping coaxial optical paths such that they illuminate a rotating polygon 110 having a plurality of facets 112. The rotating polygon 110 repeatedly and simultaneously deflects the laser beams in the direction indicated by the arrow 116. The deflected laser beams are input to a single set of imaging and correction optics 118, which focus the laser beams onto the photoreceptor 120 and correct for errors such as polygon angle error and wobble.

All four data channels are time multiplexed onto the two laser beams with either orthogonal polarizations or different wavelengths. Embodiments using multiplexed polarizations can be accomplished either with one laser always emitting a TE polarized beam and the other laser always emitting a TM polarized beam or with both lasers alternately emitting TE or TM polarized beams that are 180 degrees out of phase. Similarly, embodiments using multiplexed wavelengths can be accomplished either with each laser emitting a beam at only one wavelength or with both lasers emitting beams at both wavelengths. In all embodiments, the laser beams are separated by using one of several different combinations of active and passive beam separators so that each data channel is scanned on a separate photoreceptor.

The time division multiplexing optical system which is shown schematically in FIG. 1 comprises the multiple beam laser source 104 and the electronic signal multiplexer 102. The electronic signal multiplexer 102 receives data signals on a plurality of channels (in this illustrative embodiment, 4 channels). These signals are destined for the respective ones of the corresponding number of photoreceptors (in this illustrative embodiment, 4 photoreceptors). Thus, the data signal of channel 1 will be directed to the first photoreceptor, the data signal of channel 2 will be directed to the second photoreceptor, the data signal of channel 3 will be directed to the third photoreceptor, and the data signal of channel 4 will be directed to the fourth photoreceptor.

The data signals received by the signal multiplexer 102 are multiplexed onto a common electrical signal in a time division manner and the time division multiplexed signal is fed to the multiple beam laser source 104. The multiple light beams (2 in this example) are modulated in accordance with the incoming electrical signal to generate time division multiplexed light beams 106 which will be repeatedly and simultaneously deflected in the direction indicated by the arrow 116 by the single rotating polygon 110. The time division multiplexed light beams 106 will be separated by a dynamic beam separator (based on polarization or wavelength or both) into a number of light beams, one for each of the corresponding photoreceptors. Each dynamic beam separator includes conventional demultiplexing circuitry to enable it to read the correct data contained within the time slots to separate and direct the light beams associated with the corresponding photoreceptor.

Figure 2:
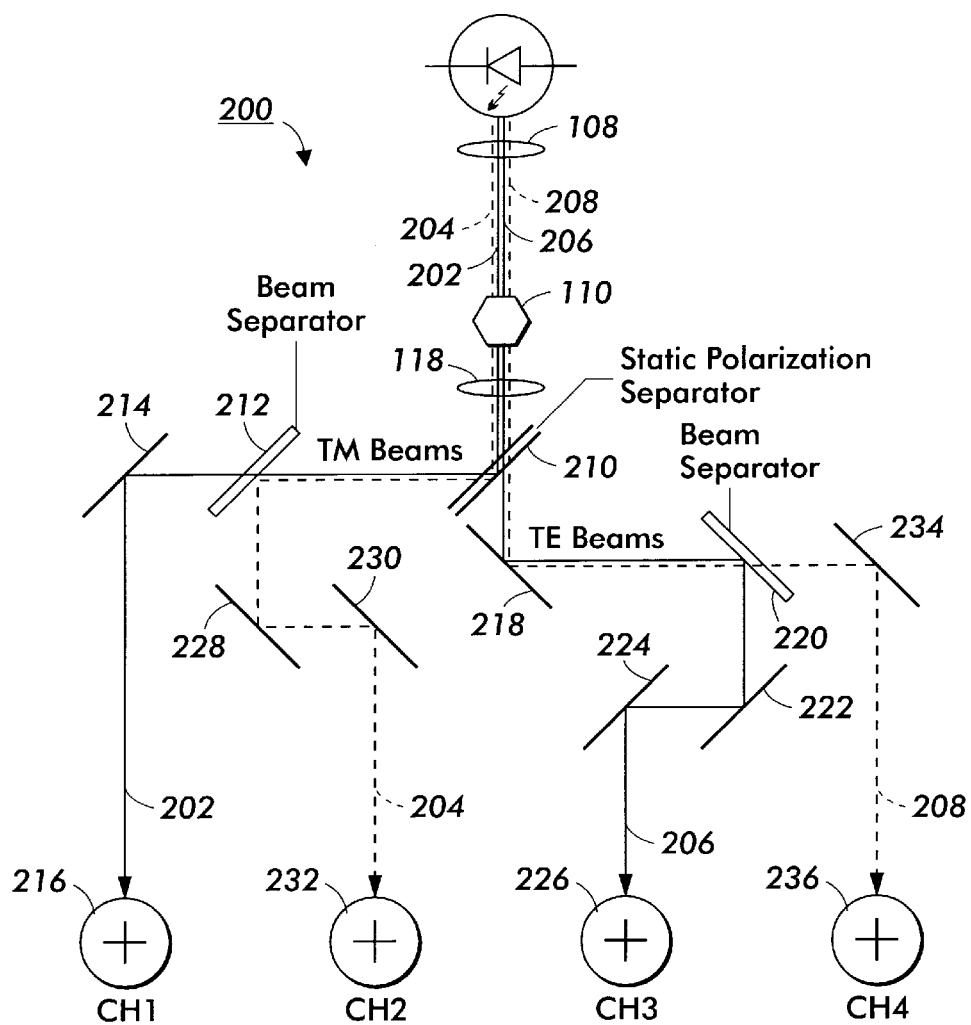
FIG. 2 is a schematic illustration of a dual laser beam multiple station printer with dynamic beam separators according to a second embodiment of the present invention.

The raster output scanner 100 is used in a first embodiment apparatus 200 as illustrated in FIG. 2. The laser source 104 in response to signals from the electronic signal multiplexer 102 will emit two coaxially overlapping, cross-polarized laser beams having substantially the same wavelength. Since the two beams are time division multiplexed into a cycle having two halves, four beams 202, 204, 206 and 208 are shown to scan across four moving photoreceptors. Beams 202 (containing the data signal of channel 1) and 204 (containing the data signal of channel 2) are emitted by the first laser having TM-polarization mode. Beam 202 is the first half of the cycle and beam 204 is the second half of the cycle. Beams 206 (containing the data signal of channel 3) and 208 (containing the data signal of channel 4) are emitted by the second laser having TE-polarization mode. Beam 206 is the first half of the cycle and beam 208 is the second half of the cycle. Only the chief rays are shown.

The apparatus 200, a multiple station printer, uses the raster output scanner 100, including polygon 110 and optics 118 and laser device 104, to produce the four laser beams 202, 204, 206 and 208 (not all components of the raster output scanner 100 are shown in FIG. 2).

Beams 202 and 206 will be written simultaneously in the first half of the cycle and beams 204 and 208 will be written simultaneously in the second half of the cycle but sequentially to the beams 202 and 206 in the first half.

Beams 202 and 206 are first input to a static polarization separator 210 in the first half of the duty cycle. The TM-polarize beam 202 will be reflected by the static polarization separator 210 to a first dynamic beam separator 212 which synchronously reflects and transmits the incident beams. Beam 202 will be transmitted by the separator 212 and reflected from static mirror 214 to the first photoreceptor 216. Meanwhile, the TE-polarized beam 206 will be transmitted by the static polarization separator 210 and reflected from a static mirror 218 to a second dynamic beam separator 220 which synchronously reflects and transmits the incident beams. Beam 206 will be reflected by the separator 220 and reflected from static mirrors 222 and 224 to the third photoreceptor 226.

Beams 204 and 208 are then input to the static polarization separator 210 in the second half of the duty cycle. The TM-polarized beam 204 will be reflected by the static polarization separator 210 to the first dynamic beam separator 212. Beam 204 will be reflected by the separator 212 and reflected from static mirrors 228 and 230 to the second photoreceptor 232. Meanwhile, the TE-polarized beam 208 will be transmitted by the static polarization separator 210 and reflected from a static mirror 218 to a second dynamic beam separator 220. Beam 208 will be transmitted by the separator 220 and reflected from static mirror 234 to the fourth photoreceptor 236.

In this embodiment 200, channels 1 and 2 are assigned TM polarizations and channels 3 and 4 are assigned TE polarizations. Channels 1 and 3 are written simultaneously and channels 2 and 4 are written simultaneously but sequentially to channels 1 and 3. A static separator 210 is first used to spatially separate the TE and TM beams. The time multiplexed beams at each polarization are then separated by a dynamic beam separator 212 or 220 which synchronously reflects and transmits the incident beams. In this way, the light beam with data for the first and second photoreceptors is switched to the first photoreceptor when channel 1 information is present and to the second photoreceptor when channel 2 information is present. This embodiment utilizes one static polarization separator and 2 dynamic beam separators.

The dynamic beam separator 212 and 220 can be implemented from a moving mirror or from a fast mechanical shutter. Alternatively, this dynamic beam separator can be implemented with a liquid crystal waveplate in combination with a static polarization separator. The liquid crystal waveplate either rotates the polarization of the input beam or leaves it unchanged as is well known in the art. During first half of the cycle the liquid crystal waveplate transmits the input beam without polarization change so that it passes through the static separator. During the second half of the cycle, the waveplate rotates the input polarization by 90 degrees and the static separator consequently deflects the beam from its optical path as shown in FIG. 2. The static polarization separator is a polarization selective multiple layer film Polarized beam separators are well known to those in the applicable arts. Reference may be made to Vol. 10 of Applied Optics and Optical Engineering, edited by R. R. Shannon and J. C. Wyant, Chapter 10, pp 51–52.

Since each laser beam is independently modulated with image information, a distinct latent image is simultaneously printed on each photoreceptor. Thus apparatus 200 may be used for full color reproduction, wherein the image on each photoreceptor corresponds to a different system color.

Since the system illustrated in FIG. 2 simultaneously forms, sweeps, and corrects each beam, and since all beams are from substantially the same spatial location and have substantially parallel optical axes, similarly dimensioned beams are input to the static polarization separator 210. Thus the problem of maintaining equal optical path lengths for each beam reduces to the much simpler problem of maintaining substantially equal optical path lengths from the polarization separator 210 to the individual photoreceptors. Substantially equal optical path lengths are set by adjusting the individual optical path lengths by properly positioning mirrors 214, 228, 230, 218, 222, 224, and 234. Additionally, the problem of registration is reduced since the characteristics of the mirror surface area and related optics which sweep and form the beams are simultaneously shared by all of the beams. Furthermore, since both beams are nominally at the same wavelength, the beam forming optics do not have to be designed to simultaneously focus two wavelengths at the same distance.

This first embodiment 200 architecture can also be used with two lasers operating at different wavelengths with the same polarization provided the first and second photoreceptors and channels 1 and 2 are assigned to one wavelength and the third and fourth photoreceptors and channels 3 and 4 are assigned to the other wavelength and a static wavelength separator is used in place of the static polarization separator 210 in FIG. 2. The static wavelength separator is comprised of wavelength selective multiple layer films that transmit light of one wavelength and reflect light of a second wavelength. Such dichroic separators are well known in the art Reference is made to Volume 1 of "Applied Optics and Optical Engineering", (1965) edited by R. Kingslake, in several places, including chapter 5 and chapter 8.

Figure 3:
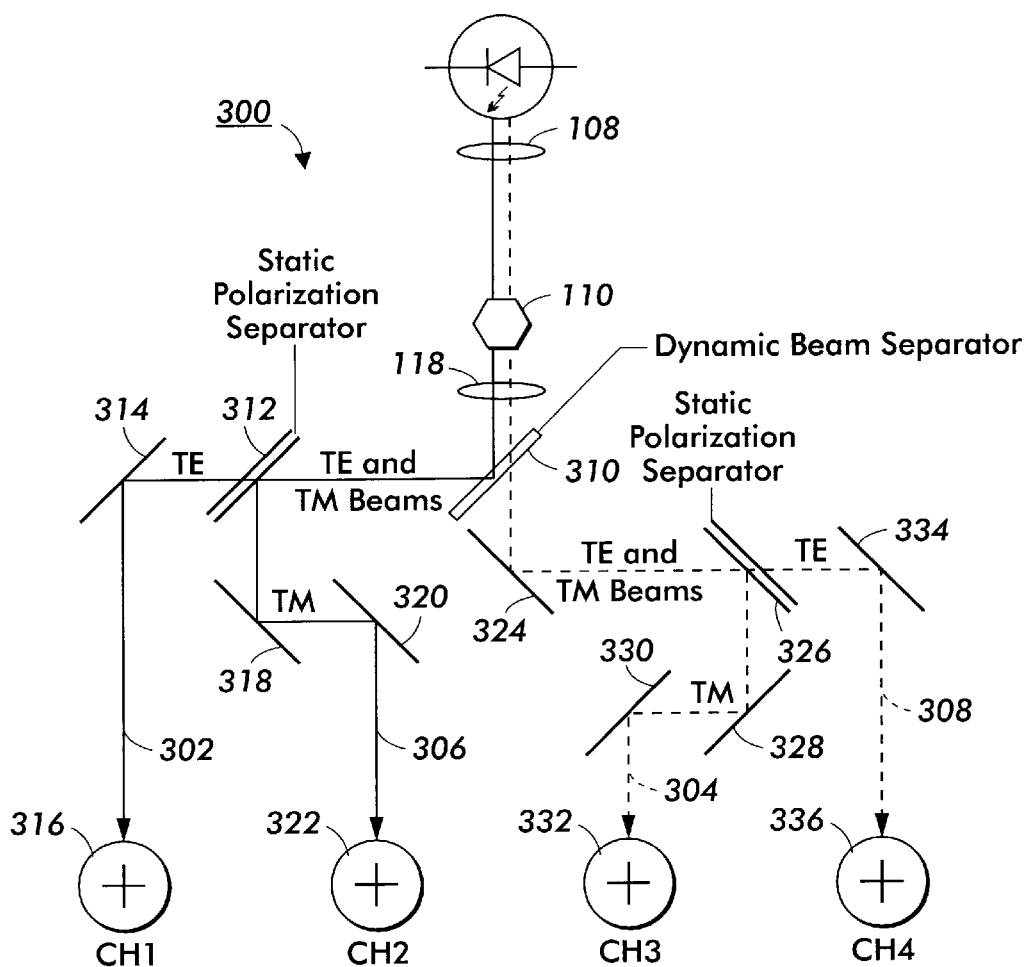
FIG. 3 is a schematic illustration of a dual laser beam multiple station printer with a dynamic beam separator according to a third embodiment of the present invention.

The raster output scanner 100 is used in a second embodiment apparatus 300 as illustrated in FIG. 3. The laser source 104 in response to signals from the electronic signal multiplexer 102 will emit two coaxially overlapping, cross-polarized laser beams having substantially the same wavelength. Since the two beams are time division multiplexed into a cycle having two halves, four beams 302, 304, 306 and 308 are shown to scan across four moving photoreceptors. The following changes were required to fix the polarization states of the transmitted and reflected beams at separator 326. Beams 302 (containing the data signal of channel 1) and 308 (containing the data signal of channel 4) are emitted by the first laser having TE-polarization mode. Beam 302 is the first half of the cycle and beam 304 is the second half of the cycle. Beams 306 (containing the data signal of channel 2) and 304 (containing the data signal of channel 3) are emitted by the second laser having TM-polarization mode. Beam 306 is the first half of the cycle and beam 308 is the second half of the cycle. Only the chief rays are shown.

The apparatus 200, a multiple station printer, uses the raster output scanner 100, including polygon 110 and optics 118 and laser device 104, to produce the four laser beams 302, 304, 306 and 308 (not all components of the raster output scanner 100 are shown in FIG. 3).

Beams 302 and 306 will be written simultaneously in the first half of the cycle and beams 304 and 308 will be written simultaneously in the second half of the cycle but sequentially to the beams 302 and 306 in the first half.

Beams 302 and 306 are first input to a dynamic beam separator 310 in the first half of the duty cycle. The TE-polarized beam 302 will be reflected by the dynamic beam separator 310 to a first static polarization separator 312. Beam 302 will be transmitted by the separator 312 and reflected from static mirror 314 to the first photoreceptor 316. Meanwhile, the TM-polarized beam 306 will also be reflected by the dynamic beam separator 310 to the first static polarization separator 312. Beam 306 will be reflected by the separator 312 and reflected from static mirrors 318 and 320 to the second photoreceptor 322.

Beams 304 and 308 are then input to the dynamic beam separator 310 in the second half of the duty cycle. The TM-polarized beam 304 will be transmitted by the separator 310 and reflected by static mirror 324 to the second static polarization separator 326. Beam 304 will be reflected by the separator 326 and reflected from static mirrors 328 and 330 to the third photoreceptor 332. Meanwhile, the TE-polarized beam 308 will be transmitted by the dynamic beam separator 310 and reflected from the static mirror 324 to the second static polarization separator 326. Beam 308 will be transmitted by the separator 326 and reflected from static mirror 334 to the fourth photoreceptor 336.

In this embodiment 300, channels 1 and 4 are assigned TE polarizations and channels 2 and 3 are assigned TM polarization. Channels 1 and 2 are written simultaneously and channels 3 and 4 are written simultaneously but sequentially to channels 1 and 2. During the first part of the writing cycle, when channels 1 and 2 are written, a dynamic beam separator 310 reflects the incident beams. The static separator 312 then directs the orthogonally polarized beams for channels 1 and 2 to their respective stations. During the second part of the writing cycle, when channels 3 and 4 are written, a dynamic beam separator transmits the incident beams. The static separator 326 then directs the orthogonally polarized beams for channels 3 and 4 to their respective stations. This embodiment 300 utilizes one dynamic polarization separator and 2 static separators.

This second embodiment 300 architecture can also be used with two lasers operating at different wavelengths with the same polarization provided the first and third photoreceptors and channels 1 and 4 are assigned to one wavelength and the second and fourth photoreceptors and channels 2 and 3 are assigned to the other wavelength and static wavelength separators are used in place of the static polarization separators 312 and 326 in FIG. 3.

Figure 4:
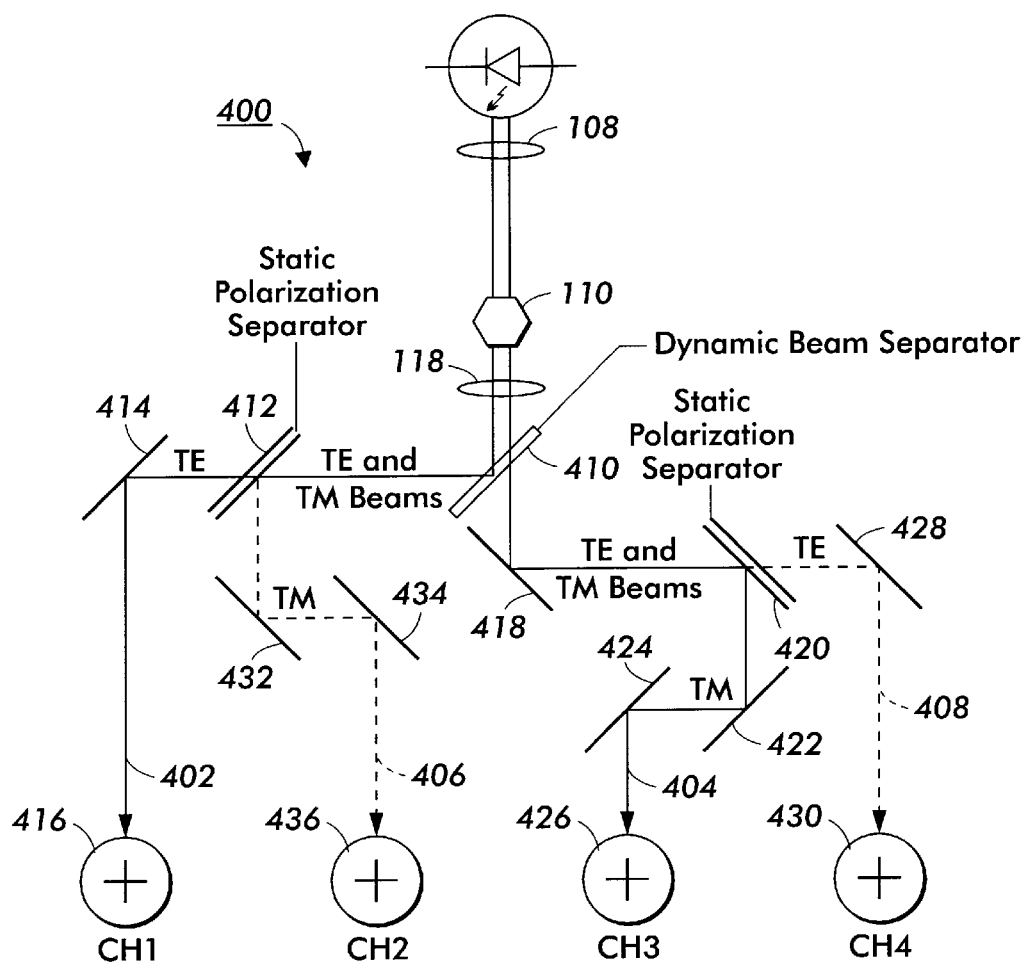
FIG. 4 is a schematic illustration of a dual laser beam multiple station printer with a dynamic polarization separator according to a fourth embodiment of the present invention.

The raster output scanner 100 is used in a third embodiment apparatus 400 as illustrated in FIG. 4. The laser source 104 in response to signals from the electronic signal multiplexer 102 will emit two coaxially overlapping, cross-polarized laser beams having substantially the same wavelength. Since the two beams are time division multiplexed into a cycle having two halves, four beams 402, 404, 406 and 408 are shown to scan across four moving photoreceptors. Beams 402 (containing the data signal of channel 1) and 408 (containing the data signal of channel 4) are emitted by the first laser having TE-polarization mode. Beam 402 is the first half of the cycle and beam 408 is the second half of the cycle. Beams 404 (containing the data signal of channel 3) and 406 (containing the data signal of channel 2) are emitted by the second laser having TM-polarization mode. Beam 404 is the first half of the cycle and beam 406 is the second half of the cycle. Only the chief rays are shown.

The apparatus 400, a multiple station printer, uses the raster output scanner 100, including polygon 110 and optics 118 and laser device 104, to produce the four laser beams 402, 404, 406 and 408 (not all components of the raster output scanner 100 are shown in FIG. 4).

Beams 402 and 404 will be written simultaneously in the first half of the cycle and beams 406 and 408 will be written simultaneously in the second half of the cycle but sequentially to the beams 402 and 404 in the first half.

Beams 402 and 404 are first input to a dynamic polarization separator 410 in the first half of the duty cycle. The TE-polarized beam 402 will be reflected by the dynamic polarization separator 410 to a first static polarization separator 412. Beam 402 will be transmitted by the separator 412 and reflected from static mirror 414 to the first photoreceptor 416. Meanwhile, the TM-polarzed beam 404 will be transmitted by the dynamic polarization separator 410 and reflected from a static mirror 418 to a second static polarization separator 420. Beam 404 will be reflected by the separator 420 and reflected from static mirrors 422 and 424 to the third photoreceptor 426.

Beams 406 and 408 are then input to the static polarization separator 410 in the second half of the duty cycle. The TE-polarized beam 408 will be transmitted by the dynamic polarization separator 410 and reflected from a static mirror 418 to a second static polarization separator 420. Beam 408 will be transmitted by the separator 420 and reflected from static mirror 428 to the fourth photoreceptor 430. The TM-polarized beam 406 will be reflected by the dynamic polarization separator 410 to the first static polarization separator 412. Beam 406 will be reflected by the separator 412 and reflected from static mirrors 432 and 434 to the second photoreceptor 436.

In this embodiment 400, channels 1 and 4 are assigned TE polarizations and channels 2 and 3 are assigned TM polarization. Channels 1 and 3 are written simultaneously and channels 2 and 4 are written simultaneously but sequentially to channels 1 and 3. During the first part of the writing cycle, when channels 1 and 3 are written, a dynamic beam separator reflects TE polarized light and transmits TM polarized light to separate the beams. The static polarization separators 412 and 420 then direct the beams for channels 1 and 3 to their respective stations. During the second part of the writing cycle, when channels 2 and 4 are written, the dynamic beam separator reflects TM polarized light and transmits TE polarized light to separate the beams. The static separators 412 and 420 then direct the beams for channels 2 and 4 to their respective stations.

This third embodiment 400 differs from the first and second embodiments 200 and 300 in that it utilizes a dynamic polarization separator.

The dynamic polarization beam separator 410 can be made from an electronic liquid crystal waveplate and a static thin film polarization separator. During one half of the cycle, corresponding to the second half of the modulation cycle, the waveplate transmits the TE and TM beams without polarization rotation and the polarization separator transmits the TE beam and reflects the TM beam. During the other half of the cycle corresponding to the first half of the modulation cycle, the waveplate rotates both polarizations by 90 degrees, so that the static separator transmits the TM beam and reflects the TE beam.

This third embodiment 400 architecture can also be used with two lasers operating at different wavelengths with the same polarization provided a dynamic wavelength separator, e.g. a tunable grating, is used in place of the dynamic polarization separator 410 in FIG. 4.

Figure 5:
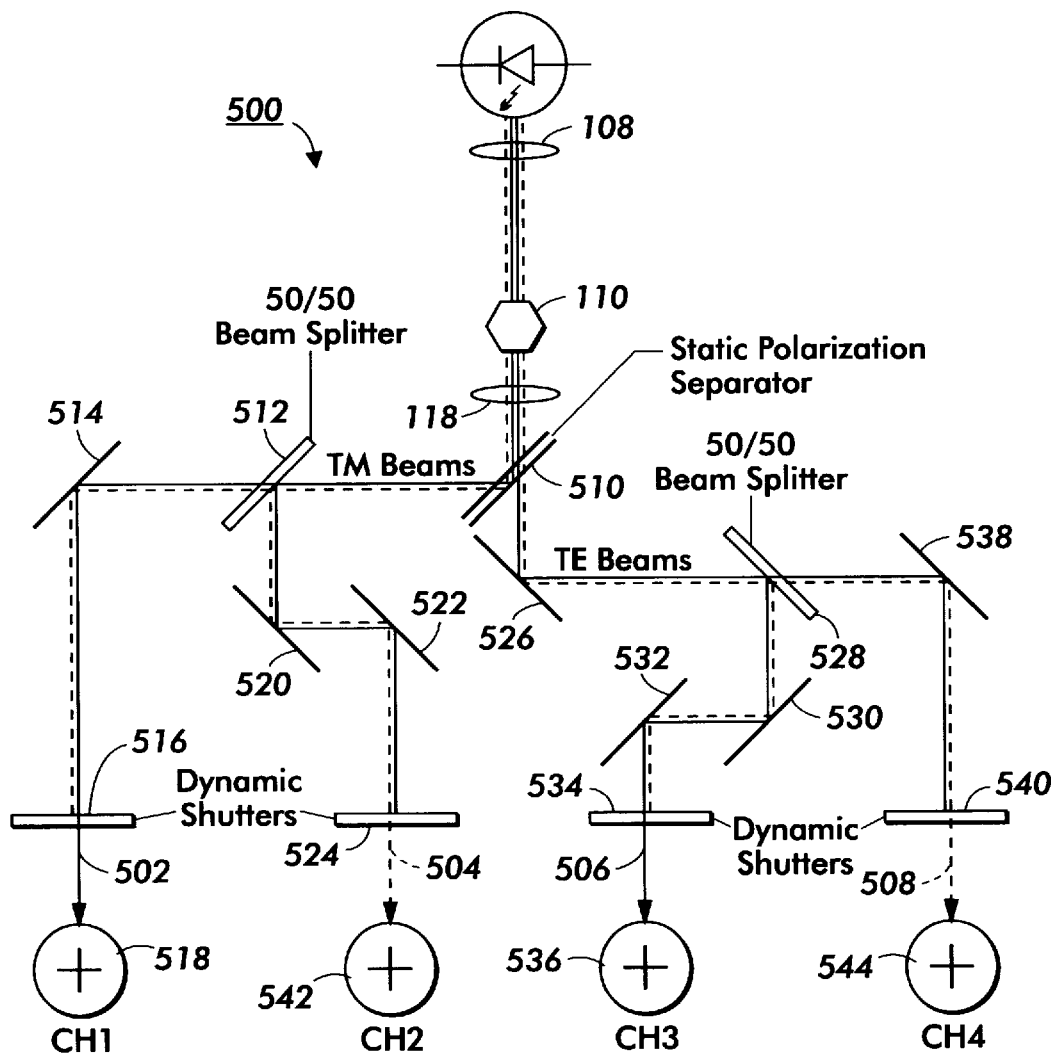
FIG. 5 is a schematic illustration of a dual laser beam multiple station printer with dynamic shutters according to a fifth embodiment of the present invention.

The fourth embodiment 500 of FIG. 5 is similar to the first embodiment 200 of FIG. 2 except that four dynamic shutters are used in lieu of two dynamic beam separators.

The raster output scanner 100 is used in a fourth embodiment apparatus 500 as illustrated in FIG. 5. The laser source 104 in response to signals from the electronic signal multiplexer 102 will emit two coaxially overlapping, cross-polarized laser beams having substantially the same wavelength. Since the two beams are time division multiplexed into a cycle having two halves, four beams 502, 504, 506 and 508 are shown to scan across four moving photoreceptors. Beams 502 (containing the data signal of channel 1) and 504 (containing the data signal of channel 2) are emitted by the first laser having TM-polarization mode. Beam 502 is the first half of the cycle and beam 504 is the second half of the cycle. Beams 506 (containing the data signal of channel 3) and 508 (containing the data signal of channel 4) are emitted by the second laser having TE-polarization mode. Beam 506 is the first half of the cycle and beam 508 is the second half of the cycle. Only the chief rays are shown.

The apparatus 500, a multiple station printer, uses the raster output scanner 100, including polygon 110 and optics 118 and laser device 104, to produce the four laser beams 502, 504, 506 and 508 (not all components of the raster output scanner 100 are shown in FIG. 5).

Beams 502 and 506 will be written simultaneously in the first half of the cycle and beams 504 and 508 will be written simultaneously in the second half of the cycle but sequentially to the beams 502 and 506 in the first half.

Beams 502 and 506 are first input to a static polarization separator 510 in the first half of the duty cycle. The TM-polarized beam 502 will be reflected by the static polarization separator 510 to a first 50/50 beamsplitter 512 which transmits one-half of an incident beam and reflects one-half of the incident beam. A portion of the beam 502 will be transmitted by the beamsplitter 512 and reflected by the static mirror 514 to the first dynamic shutter 516 which alternately opens and closes synchronously to allow the appropriate beam or beams to reach its photoreceptor. The dynamic shutter 516 opens and beam 502 is transmitted to the first photoreceptor 518. The other portion of the beam 502 will be reflected by the beamsplitter 512 and reflected by the static mirrors 520 and 522 to the second dynamic shutter 524. The dynamic shutter 524 shuts and beam 502 is blocked.

Meanwhile, the TE-polarized beam 506 will be transmitted by the static polarization separator 510 and reflected from a static mirror 526 to a second 50/50 beamsplitter 528 which transmits one-half of an incident beam and reflects one-half of the incident beam. A portion of the beam 506 will be reflected by the beamsplitter 528 and reflected by the static mirrors 530 and 532 to the third dynamic shutter 534. The dynamic shutter 534 opens and beam 506 is transmitted to the third photoreceptor 536. The other portion of the beam 506 will be transmitted by the beamsplitter 528 and reflected by the static mirror 538 to the fourth dynamic shutter 540. The dynamic shutter 540 shuts and beam 502 is blocked.

Beams 504 and 508 are then input to the static polarization separator 510 in the second half of the duty cycle. The TM-polarized beam 504 will be reflected by the static polarization separator 510 to the first 50/50 beamsplitter 512. A portion of the beam 504 will be transmitted by the beamsplitter 512 and reflected by the static mirror 514 to the first dynamic shutter 516. The dynamic shutter 516 shuts and beam 504 is blocked. The other portion of the beam 504 will be reflected by the beamsplitter 512 and reflected by the static mirrors 520 and 522 to the second dynamic shutter 524. The dynamic shutter 524 opens and beam 504 is transmitted to the second photoreceptor 542.

Meanwhile, the TE-polarized beam 508 will be transmitted by the static polarization separator 510 and reflected from a static mirror 526 to a second 50/50 beamsplitter 528. A portion of the beam 508 will be reflected by the beamsplitter 528 and reflected by the static mirrors 530 and 532 to the third dynamic shutter 534. The dynamic shutter 534 shuts and beam 508 is blocked. The other portion of the beam 508 will be transmitted by the beamsplitter 528 and reflected by the static mirror 538 to the fourth dynamic shutter 540. The dynamic shutter 540 opens and beam 508 is transmitted to the fourth photoreceptor 544.

This fourth embodiment 500 requires each laser to emit twice the power due to additional beam splitting. However, the dynamic shutter is a much simpler optical device than a dynamic beam separator or dynamic polarization separator since it need only transmit or block the incident beams. The fourth embodiment uses one static polarization separator, two 50/50 beamsplitters and four dynamic shutters.

This fourth embodiment 500 architecture can also be used with two lasers operating at different wavelengths with the same polarization provided the first and second photoreceptors and channels 1 and 2 are assigned to one wavelength and the third and fourth photoreceptors and channels 3 and 4 are assigned to the other wavelength and a static wavelength separator as described above is used in place of the static polarization separator 510 in FIG. 2.

Figure 6:
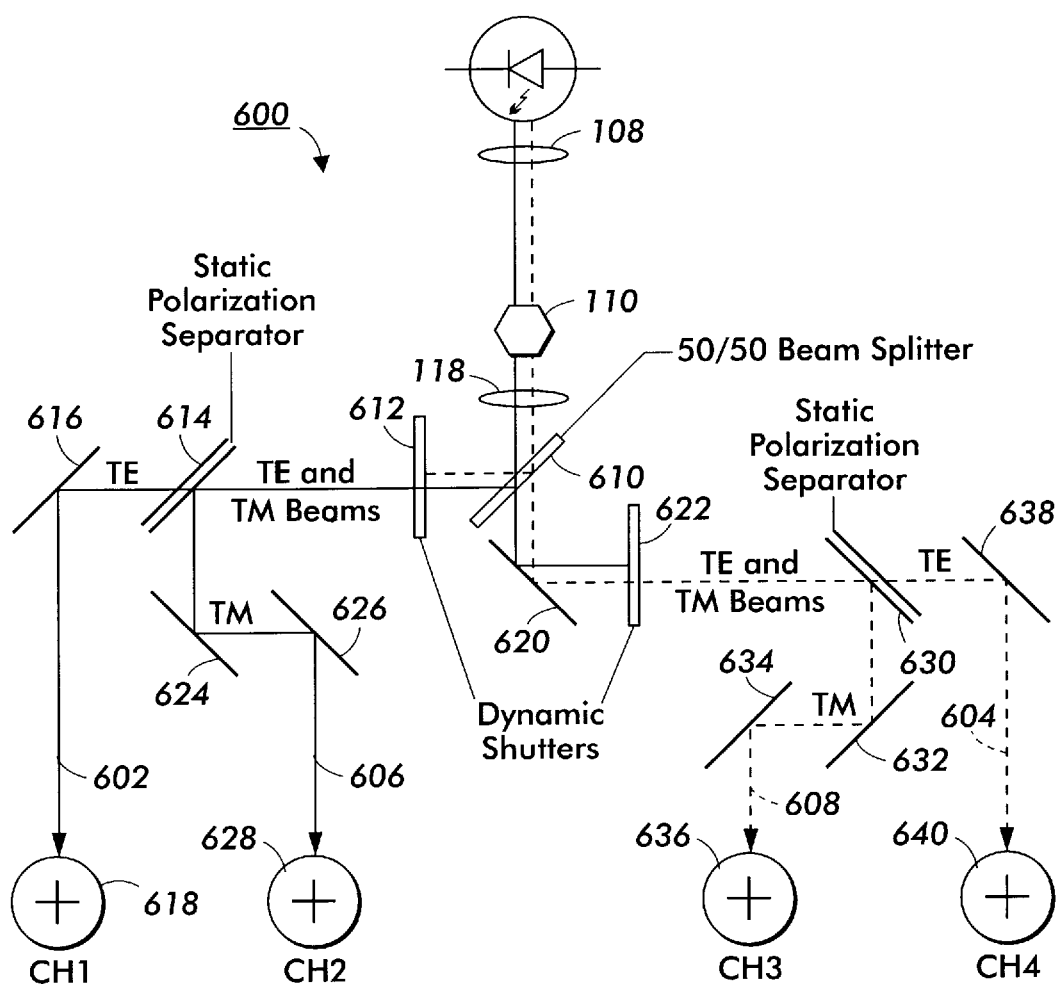
FIG. 6 is a schematic illustration of a dual laser beam multiple station printer with dynamic shutters according to a sixth embodiment of the present invention.

The fifth embodiment 600 of FIG. 6 is similar to the second embodiment 300 of FIG. 3 except that two dynamic shutters are used in lieu of one dynamic beam separator.

The raster output scanner 100 is used in a fifth embodiment apparatus 600 as illustrated in FIG. 6. The laser source 104 in response to signals from the electronic signal multiplexer 102 will emit two coaxially overlapping, cross-polarized laser beams having substantially the same wavelength. Since the two beams are time division multiplexed into a cycle having two halves, four beams 602, 604, 606 and 608 are shown to scan across four moving photoreceptors. Beams 602 (containing the data signal of channel 1) and 604 (containing the data signal of channel 4) are emitted by the first laser having TE-polarization mode. Beam 602 is the first half of the cycle and beam 604 is the second half of the cycle. Beams 606 (containing the data signal of channel 2) and 608 (containing the data signal of channel 3) are emitted by the second laser having TM-polarization mode. Beam 606 is the first half of the cycle and beam 608 is the second half of the cycle. Only the chief rays are shown.

The apparatus 600, a multiple station printer, uses the raster output scanner 100, including polygon 110 and optics 118 and laser device 104, to produce the four laser beams 602, 604, 606 and 608 (not all components of the raster output scanner 100 are shown in FIG. 6).

Beams 602 and 606 will be written simultaneously in the first half of the cycle and beams 604 and 608 will be written simultaneously in the second half of the cycle but sequentially to the beams 602 and 606 in the first half.

Beams 602 and 606 are first input to a 50/50 beam splitter 610 in the first half of the duty cycle. A portion of the TE-polarized beam 602 will be reflected by the beamsplitter 610 to a first dynamic shutter 612. The shutter 612 opens and beam 602 will be transmitted to a first static polarization separator 614. Beam 602 will be transmitted by the separator 614 and reflected from static mirror 616 to the first photoreceptor 618. The other portion of the TE-polarized beam 602 will be transmitted by the beamsplitter 610 to be reflected by a static mirror 620 to a second dynamic shutter 622. The shutter 622 closes and beam 602 is blocked.

Meanwhile, a portion of the TM-polarized beam 606 will be reflected by the beamsplitter 610 to a first dynamic shutter 612. The shutter 612 opens and beam 602 will be transmitted to a first static polarization separator 614. Beam 602 will be reflected by the separator 614 and reflected from static mirrors 624 and 626 to the second photoreceptor 628. The other portion of the TM-polarized beam 606 will be transmitted by the beamsplitter 610 to be reflected by a static mirror 620 to a second dynamic shutter 622. The shutter 622 closes and beam 602 is blocked.

Beams 604 and 608 are then input to the 50/50 beamsplitter 610 in the second half of the duty cycle. A portion of the TM-polarized beam 608 will be reflected by the beamsplitter 610 to the first dynamic shutter 612. The shutter 612 closes and beam 608 is blocked. The other portion of the TM-polarized beam 608 will be transmitted by the beamsplitter 610 to be reflected by a static mirror 620 to a second dynamic shutter 622. The shutter 622 opens and beam 608 is transmitted to a second static polarization separator 630. Beam 608 will be reflected by the separator 630 and reflected from static mirrors 632 and 634 to the third photoreceptor 636.

Meanwhile, a portion of the TE-polarized beam 604 will be reflected by the beamsplitter 610 to the first dynamic shutter 612. The shutter 612 closes and beam 604 is blocked. The other portion of the TE-polarized beam 604 will be transmitted by the beamsplitter 610 to be reflected by a static mirror 620 to a second dynamic shutter 622. The shutter 622 opens and beam 604 is transmitted to a second static polarization separator 630. Beam 604 will be transmitted by the separator 630 and reflected from static mirror 638 to the fourth photoreceptor 640.

During the first part of the writing cycle, when the first and second photoreceptors are written, a dynamic beam shutter 612 opens and transmits the two incident beams. The static separator 614 then directs the orthogonally polarized beams for channels 1 and 2 to their respective photoreceptors. The other dynamic shutter 622 closes and blocks the beams. During the second part of the writing cycle, when the third and fourth photoreceptors are written, the dynamic beam shutter 622 opens and transmits the incident beams. The static separator 630 then directs the orthogonally polarized beams for channels 3 and 4 to their respective photoreceptors. The other dynamic shutter 612 closes and blocks the beams. This embodiment utilizes one 50/50 beamsplitter and two dynamic beam shutters and two static polarization separators.

This fifth embodiment 600 architecture can also be used with two lasers operating at different wavelengths with the same polarization provided the first and third photoreceptors and channels 1 and 4 are assigned to one wavelength and the second and fourth photoreceptors and channels 2 and 3 are assigned to the other wavelength and static wavelength separators are used in place of the static polarization separators 614 and 630 in FIG. 6.

These preferred embodiments multiplex channels at each pixel. However, pixel multiplexing requires the dynamic beam separator to switch between pixels in a fraction of a pixel time. Such fast switching may be more easily attainable with reflecting separators than with polarization separators and for low speed printers rather than high speed printers where the required switching time may only be a few nanoseconds. Since nanosecond switching times may be somewhat problematic for current liquid crystals, the best embodiment for high speed printers currently multiplexes the channels line by line. Line times in the fastest printers are 200 microseconds or more. Liquid crystal materials with switching times in the range of 1 to 10 microseconds are presently known. Adequately fast line switching should be feasible today.

One disadvantage of line multiplexing is that it reduces the writing speed of the system since two facet scans are required to write one line at all 4 stations. To maintain the writing speed, the number of lasers at each polarization must be doubled in order to write 2 lines at each station on each scan. Pixel multiplexing is the preferred embodiment so that a line is written at each station during each sweep. In spite of the additional lasers required for line multiplexing, the architecture remains advantageous since the laser array is composed of only 2 different lasers if side by side crossed polarized or dual wavelength lasers are used and only one type of laser if a polarization or wavelength multiplexed laser is used. Since it is easier to increase the number of lasers of the same type in a monolithic array than to combine multiple lasers of different wavelengths and/or polarizations, this architecture may be advantaged when multiple lasers are required to write in parallel at each station due to limitations in the speed of the polygon.

Figure 7:
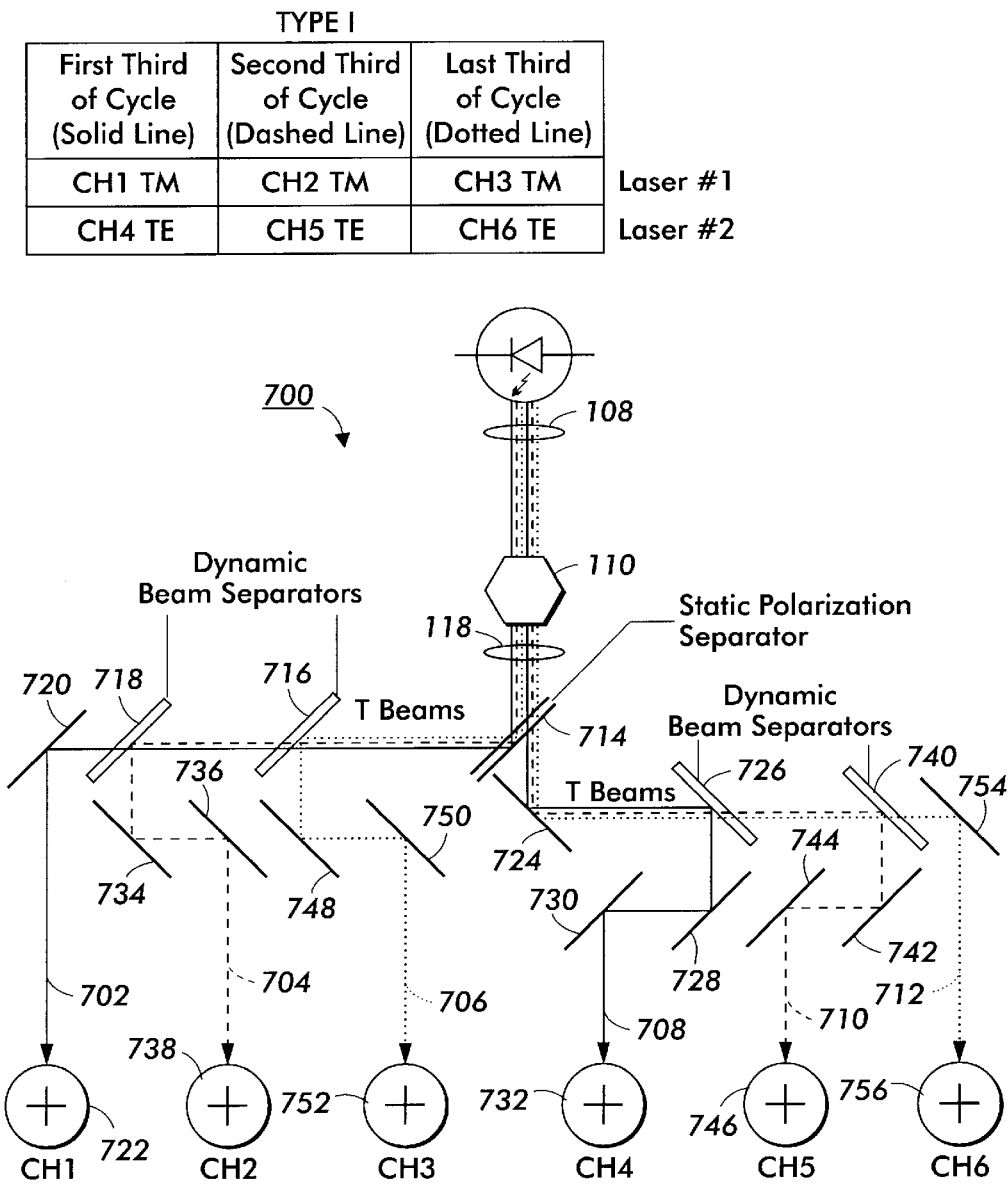
FIG. 7 is a schematic illustration of a dual laser beam, six channel, multiple station printer with dynamic beam separators according to a seventh embodiment of the present invention.

The architectures of these embodiments are easily extended to writing at more than 4 stations. For example, FIG. 7 shows an architecture for writing at 6 stations with an array of multiple cross-polarized lasers at the same wavelength. In this case, each cycle is divided into thirds for the time division multiplexing.

The raster output scanner 100 is used in a sixth embodiment apparatus 700 as illustrated in FIG. 7. The laser source 104 in response to signals from the electronic signal multiplexer 102 will emit two coaxially overlapping, cross-polarized laser beams having substantially the same wavelength. Since the two beams are time division multiplexed into a cycle having three thirds, six beams 702, 704, 706, 708, 710 and 712 are shown to scan across six moving photoreceptors. Beams 702 (containing the data signal of channel 1), 704 (containing the data signal of channel 2), and 706 (containing the data signal of channel 3) are emitted by the first laser having TM-polarization mode. Beam 702 is the first third of the cycle, beam 704 is the second third of the cycle and beam 706 is in the third third of the cycle. Beams 708 (containing the data signal of channel 4), 710 (containing the data signal of channel 5) and 712 (containing the data signal of channel 6) are emitted by the second laser having TE-polarization mode. Beam 708 is the first third of the cycle, beam 710 is the second third of the cycle and beam 712 is in the third third of the cycle. Only the chief rays are shown.

The apparatus 700, a multiple station printer, uses the raster output scanner 100, including polygon 110 and optics 118 and laser device 104, to produce the six laser beams 702, 704, 706, 708, 710 and 712 (not all components of the raster output scanner 100 are shown in FIG. 7).

Beams 702 and 708 will be written simultaneously in the first third of the cycle. Beams 704 and 710 will be written simultaneously in the second third of the cycle but sequentially to the beams 702 and 708 in the first third. Beams 706 and 712 will be written simultaneously in the third third of the cycle but sequentially to the beams 702 and 708 in the first third and the beams 704 and 710 in the second third.

Beams 702 and 708 are first input to a static polarization separator 714 in the first third of the duty cycle. The TM-polarized beam 702 will be reflected by the static polarization separator 714 to a first dynamic beam separator 716. Beam 702 will be transmitted by the first separator 716 to a second dynamic beam separator 718. Beam 702 will be transmitted by the second separator 718 and reflected from static mirror 720 to the first photoreceptor 722. Meanwhile, the TE-polarized beam 708 will be transmitted by the static polarization separator 714 and reflected from a static mirror 724 to a third dynamic beam separator 726. Beam 708 will be reflected by the third separator 726 and reflected from static mirrors 728 and 730 to the fourth photoreceptor 732.

Beams 704 and 710 are then input to the static polarization separator 714 in the second third of the duty cycle. The TM-polarized beam 704 will be reflected by the static polarization separator 714 to the first dynamic beam separator 716. Beam 704 will be transmitted by the first separator 716 to the second dynamic separator 718. Beam 704 will be reflected by the second separator 718 and reflected from static mirrors 734 and 736 to the second photoreceptor 738. Meanwhile, the TE-polarized beam 710 will be transmitted by the static polarization separator 714 and reflected from a static mirror 724 to the third dynamic beam separator 726. Beam 710 will be transmitted by the third separator 726 to a fourth dynamic beam separator 740. Beam 710 will be reflected by the fourth separator 740 and reflected from static mirrors 742 and 744 to the fifth photoreceptor 746.

Beams 706 and 712 are then input to the static polarization separator 714 in the third third of the duty cycle. The TM-polarized beam 706 will be reflected by the static polarization separator 714 to the first dynamic beam separator 716. Beam 706 will be reflected by the separator 716 and reflected from static mirrors 748 and 750 to the third photoreceptor 752. Meanwhile, the TE-polarized beam 712 will be transmitted by the static polarization separator 714 and reflected from a static mirror 724 to the third dynamic beam separator 726. Beam 708 will be transmitted by the third separator 726 to the fourth dynamic beam separator 740. Beam 708 will be transmitted by the fourth separator 740 and reflected from static mirror 754 to the sixth photoreceptor 756.

The architecture of embodiment 700 requires 1 static polarization separator and 4 dynamic beam separators of the reflective/transmissive type.

This sixth embodiment 700 architecture can also be used with two lasers operating at different wavelengths with the same polarization provided the first and second and third photoreceptors and channels 1 and 2 and 3 are assigned to one wavelength and the fourth and fifth and sixth photoreceptors and channels 4 and 5 and 6 are assigned to the other wavelength and a static wavelength separator as described above is used in place of the static polarization separator 714 in FIG. 7.

Figure 8:
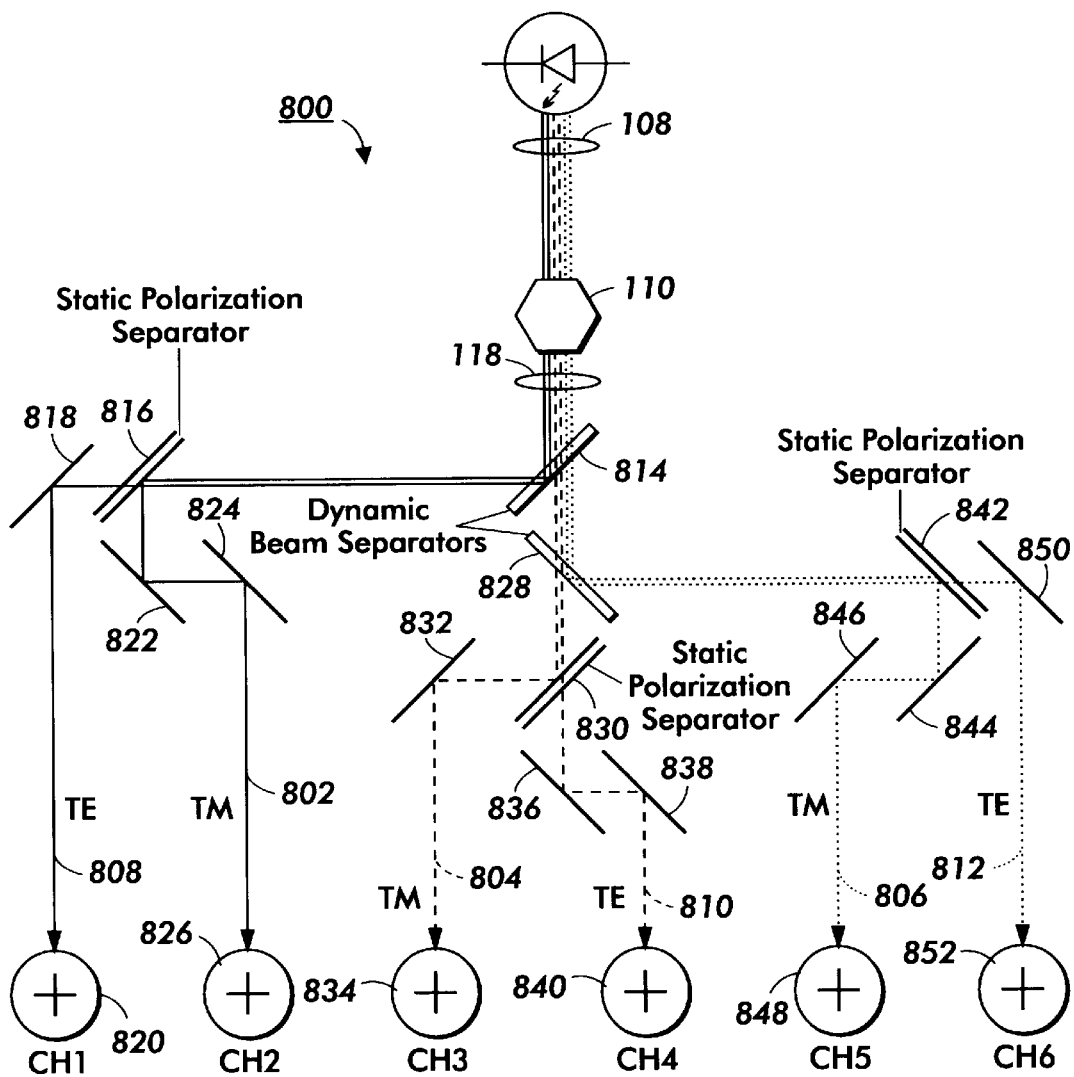
FIG. 8 is a schematic illustration of a dual laser beam, six channel, multiple station printer with dynamic beam separators according to an eighth embodiment of the present invention.

FIG. 8 also shows an architecture for writing at 6 stations with an array of multiple cross-polarized lasers at the same wavelength. In this case, each cycle is divided into thirds for the time division multiplexing.

The raster output scanner 100 is used in a seventh embodiment apparatus 800 as illustrated in FIG. 8. The laser source 104 in response to signals from the electronic signal multiplexer 102 will emit two coaxially overlapping, cross-polarized laser beams having substantially the same wavelength. Since the two beams are time division multiplexed into a cycle having three thirds, six beams 802, 804, 806, 808, 810 and 812 are shown to scan across six moving photoreceptors. Beams 802 (containing the data signal of channel 2), 804 (containing the data signal of channel 3), and 806 (containing the data signal of channel 5) are emitted by the first laser having TM-polarization mode. Beam 802 is the first third of the cycle, beam 804 is the second third of the cycle and beam 806 is in the third third of the cycle. Beams 808 (containing the data signal of channel 1), 810 (containing the data signal of channel 4), and 812 (containing the data signal of channel 6) are emitted by the second laser having TE-polarization mode. Beam 808 is the first third of the cycle, beam 810 is the second third of the cycle and beam 812 is in the third third of the cycle. Only the chief rays are shown.

The apparatus 800, a multiple station printer, uses the raster output scanner 100, including polygon 110 and optics 118 and laser device 104, to produce the six laser beams 802, 804, 806, 808, 810 and 812 (not all components of the raster output scanner 100 are shown in FIG. 8).

Beams 802 and 808 will be written simultaneously in the first third of the cycle. Beams 804 and 810 will be written simultaneously in the second third of the cycle but sequentially to the beams 802 and 808 in the first third. Beams 806 and 812 will be written simultaneously in the third third of the cycle but sequentially to the beams 802 and 808 in the first third and the beams 804 and 810 in the second third.

Beams 802 and 808 are first input to a first dynamic beam separator 814 in the first third of the duty cycle. The TE-polarized beam 808 will be reflected by the first dynamic beam separator 814 to a first static polarization separator 816. Beam 808 will be transmitted by the separator 816 and reflected from static mirror 818 to the first photoreceptor 820. Meanwhile, the TM-polarized beam 802 will also be reflected by the first dynamic beam separator 814 to the first static polarization separator 816. Beam 802 will be reflected by the separator 816 and reflected from static mirrors 822 and 824 to the second photoreceptor 826.

Beams 804 and 810 are first input to the first dynamic beam separator 814 in the second third of the duty cycle. The TM-polarized beam 804 will be transmitted by the first dynamic separator 814 to a second dynamic beam separator 828. Beam 804 will be transmitted by the second dynamic separator 828 to a second static polarization separator 830. Beam 804 will be reflected by the separator 830 and reflected from static mirror 832 to the third photoreceptor 834. Meanwhile, the TE-polarized beam 810 will also be transmitted by the first dynamic separator 814 to a second dynamic beam separator 828. Beam 810 will be transmitted by the second dynamic separator 828 to a second static polarization separator 830. Beam 810 will be transmitted by the separator 830 and reflected from static mirrors 836 and 838 to the fourth photoreceptor 840.

Beams 806 and 812 are first input to the first dynamic beam separator 814 in the third third of the duty cycle. The TM-polarized beam 806 will be transmitted by the first dynamic separator 814 to a second dynamic beam separator 828. Beam 806 will be reflected by the second dynamic separator 828 to a third static polarization separator 842. Beam 806 will be reflected by the separator 842 and reflected from static mirrors 844 and 846 to the fifth photoreceptor 848. Meanwhile, the TE-polarized beam 812 will also be transmitted by the first dynamic separator 814 to a second dynamic beam separator 828. Beam 812 will be reflected by the second dynamic separator 828 to a third static polarization separator 842. Beam 812 will be transmitted by the separator 842 and reflected from static mirror 850 to the sixth photoreceptor 852.

The architecture of embodiment 800 requires 3 static polarization separators and 2 dynamic beam separators.

This seventh embodiment 800 architecture can also be used with two lasers operating at different wavelengths with the same polarization provided the second and third and fifth photoreceptors and channels 2 and 3 and 5 are assigned to one wavelength and the first and fourth and sixth photoreceptors and channels 1 and 4 and 6 are assigned to the other wavelength and static wavelength separators are used in place of the static polarization separators 816, 830 and 842 in FIG. 8.

Figure 9:
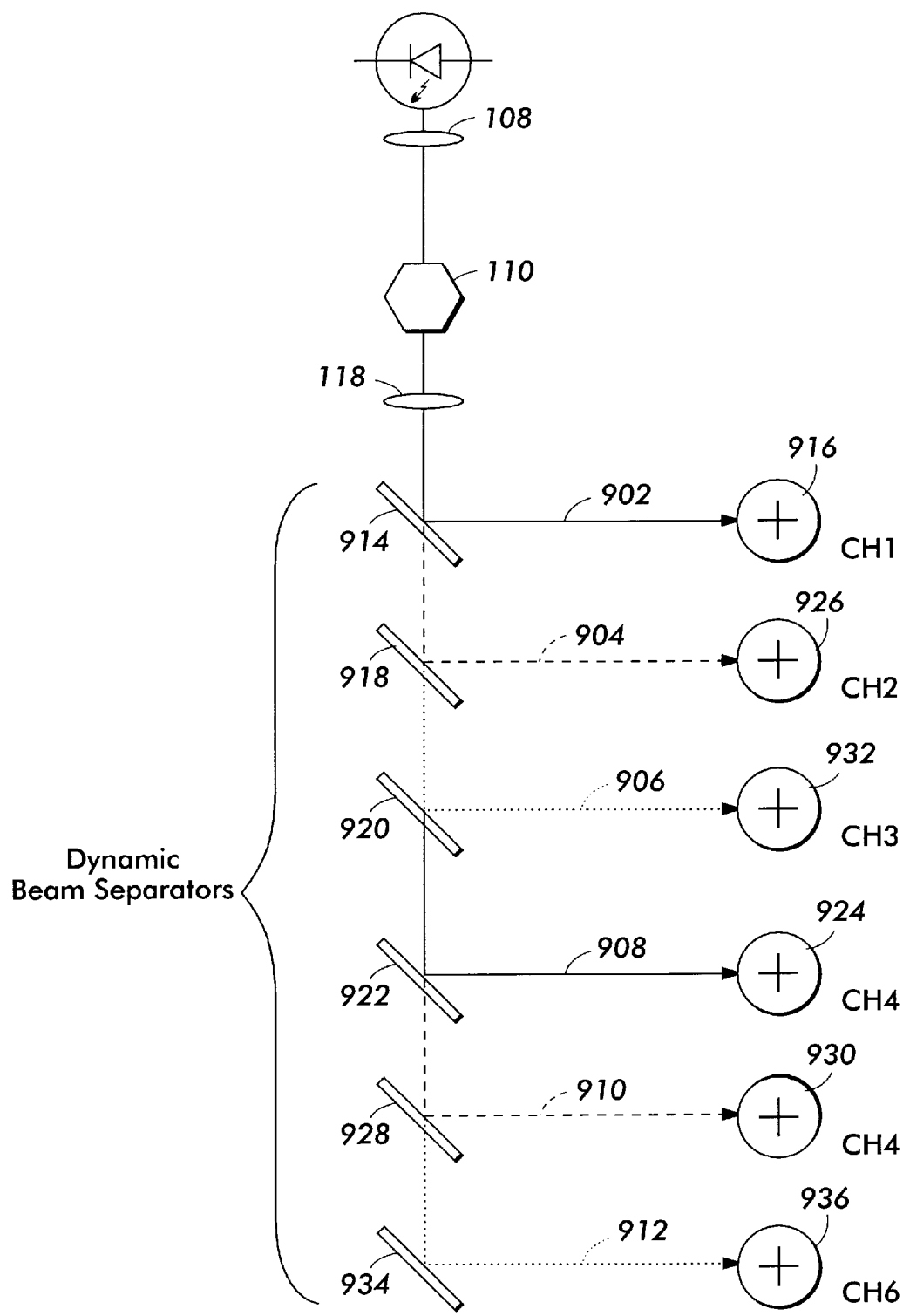
FIG. 9 is a schematic illustration of a single laser beam, six channel, multiple station printer with dynamic beam separators according to a ninth embodiment of the present invention.

FIG. 9 shows a different architecture for a multistation printer for six stations. The raster output scanner 100 is used in an eighth embodiment apparatus 900 as illustrated in FIG. 9. The laser source 104 in response to signals from the electronic signal multiplexer 102 will emit a single polarized beam 901 at substantially one wavelength. Since the single beam 901 is time division multiplexed into a cycle having six sixths, six beams 902, 904, 906, 908, 910 and 912 are shown to scan across six moving photoreceptors. Beam 902 (containing the data signal of channel 1) is formed by switching the single beam 901 to photoreceptor 916. Beam 904 (containing the data signal of channel 2) is formed by switching the single beam 901 to photoreceptor 926. Beam 906 (containing the data signal of channel 3) is formed by switching the single beam 901 to photoreceptor 932. Beam 908 (containing the data signal of channel 4) is formed by switching the single beam 901 to photoreceptor 924. Beam 910 (containing the data signal of channel 5) is formed by switching the single beam 901 to photoreceptor 930. Beam 912 (containing the data signal of channel 6) is formed by switching the single beam 901 to photoreceptor 936. Beam 902 is in the first sixth of the cycle, beam 904 is in the second sixth of the cycle, beam 906 is in the third sixth of the cycle, beam 908 is in the fourth sixth of the cycle, beam 910 is in the fifth sixth of the cycle and beam 912 is in the sixth sixth of the cycle. Only the chief rays are shown.

The apparatus 900, a multiple station printer, uses the raster output scanner 100, including polygon 110 and optics 118 and laser device 104, and dynamic beam separators 914, 918, 920, 922, and 928, and mirror 934 to produce the six laser beams 902, 904, 906, 908, 910 and 912 (not all components of the raster output scanner 100 are shown in FIG. 9).

Beam 902 will be written in the first sixth of the cycle. Beam 904 will be written in the second sixth of the cycle but sequentially to the beam 902 in the first sixth. Beam 906 will be written in the third sixth of the cycle but sequentially to the beam 902 in the first sixth and the beam 904 in the second sixth. Beam 908 will be written in the fourth sixth of the cycle but sequentially to the beam 902 in the first sixth, beam 904 in the second sixth, and beam 906 in the third sixth. Beam 910 will be written in the fifth sixth of the cycle but sequentially to the beam 902 in the first sixth, beam 904 in the second sixth, beam 906 in the third sixth, and beam 908 in the fourth sixth. Beam 912 will be written in the sixth sixth of the cycle but sequentially to the beam 902 in the first sixth, beam 904 in the second sixth, beam 906 in the third sixth, beam 908 in the fourth sixth, and beam 910 in the fifth sixth.

The single TE-polarized laser beam 901 is first input to a first dynamic beam separator 914 in the first sixth of the cycle. The TE-polarized beam 901 will be reflected by the first dynamic beam separator 914 to form beam 902 for writing on the first photoreceptor 916. The single TE-polarized beam 901 will be transmitted by the first dynamic beam separator 914 to the second dynamic beam separator 918 in the second sixth of the cycle. The TE-polarized beam 901 will be reflected by the second dynamic beam separator 918 to form beam 904 for writing on the second photoreceptor 926. The single TE-polarized beam 901 will be transmitted by the first and second dynamic beam separators 914 and 918 to the third dynamic beam separator 920 in the third sixth of the cycle. The TE-polarized beam 901 will be reflected by the third dynamic beam separator 920 to form beam 906 for writing on the third photoreceptor 932. The single TE-polarized beam 901 will be transmitted by the first, second, and third dynamic beam separators 914, 918, and 920 to the fourth dynamic beam separator 922 in the fourth sixth of the cycle. The TE-polarized beam 901 will be reflected by the fourth dynamic beam separator 922 to form beam 908 for writing on the fourth photoreceptor 924. The single TE-polarized beam 901 will be transmitted by the first, second, third, and fourth dynamic beam separators 914, 918, 920, and 922 to the fifth dynamic beam separator 928 in the fifth sixth of the cycle. The TE-polarized beam 901 will be reflected by the fifth dynamic beam separator 928 to form beam 910 for writing on the fifth photoreceptor 930. The single TE-polarized beam 901 will be transmitted by the first, second, third, fourth, and fifth dynamic beam separators 914, 918, 920, 922, and 928 to a mirror 934 in the sixth sixth of the cycle. The TE-polarized beam 901 will be reflected by the mirror 934 to form beam 912 for writing on the sixth photoreceptor 936.

It is evident from the above discussion that a similar architecture can also be used for a multistation printer with fewer than six stations.

The dynamic beam separators are reflective shutters or they can be a dynamic retardation plate followed by a static polarization separator so that the polarization of the input beam is first rotated and then reflected by the static polarization separator.

Line or page multiplexing can be used to write at multiple tandem stations with an array of identical lasers, as illustrated in FIG. 9. In this case, the dynamic beam separators are used to direct the beams among the stations. Although such a switching scheme reduces the laser complexity, it reduces the printing throughput, especially in the case where the printing at each station is done sequentially by page. Line multiplexing is preferred since all the stations can be written simultaneously and throughput increased by writing multiple lines in parallel at each station.

The embodiments 200 to 800 use two lasers with each laser emitting only one polarization state. The embodiments have a time-multiplexed TE-polarization mode laser and a time-multiplexed TM-polarization mode laser. Alternately, the embodiments 200 to 800 can use lasers that switch polarization modes from cycle to cycle. Thus, one laser would emit TE-polarization mode light in the first half of the cycle and switch to emit TM-polarization mode light in the second half of the cycle. The other laser would emit TM-polarization mode light in the first half of the cycle and switch to emit TE-polarization mode light in the second half of the cycle. The data channels and corresponding photoreceptors would also be switched accordingly.

The embodiment 900 teaches a single time division multiplexed laser. By utilizing, a single laser that is both time division multiplexed and polarization switchable, other embodiments of the present invention are possible.

Figure 10:
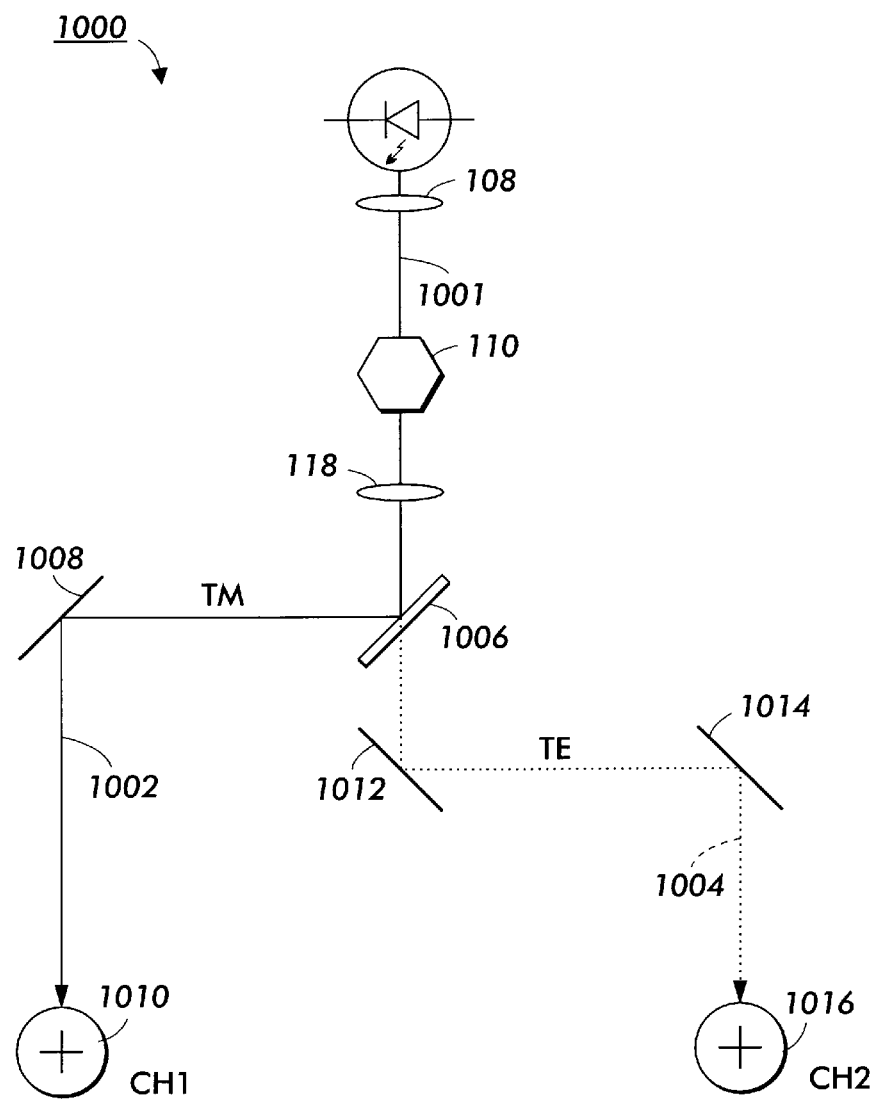
FIG. 10 is a schematic illustration of a single laser beam multiple station printer with a beam separator according to a tenth embodiment of the present invention.

The raster output scanner 100 is used in an ninth embodiment apparatus 1000 as illustrated in FIG. 10. The laser source 104 in response to signals from the electronic signal multiplexer 102 will emit a single polarization switchable beam 1001 at substantially one wavelength.

Since the single beam is time division multiplexed into a cycle having two halves, two beams 1002 and 1004 are shown to scan across two moving photoreceptors. Beam 1002 (containing the data signal of channel 1) is emitted by the single laser having TM-polarization mode in the first half of the cycle and beam 1004 is the second half of the cycle. Beam 1004 (containing the data signal of channel 2) is emitted by the first laser having TE-polarization mode in the second half of the cycle. Only the chief rays are shown.

The apparatus 1000, a multiple station printer, uses the raster output scanner 100, including polygon 110 and optics 118 and laser device 104, to produce the two laser beams 1002 and 1004 (not all components of the raster output scanner 100 are shown in FIG. 10).

Beam 1002 will be written in the first half of the cycle and beam 1004 will be written in the second half of the cycle sequentially to the beam 1002 in the first half.

Beam 1002 is first input to a polarization separator 1006 in the first half of the duty cycle. The TM-polard beam 1002 will be reflected by the polarization separator 1006 to a static mirror 1008 to the first photoreceptor 1010.

Beam 1004 is then input to the polarization separator 1006 in the second half of the duty cycle. The TE-polarized beam 1004 will be transmitted by the polarization separator 1006 and reflected from static mirrors 1012 and 1014 to the second photoreceptor 1016.

The polarization separator 1006 can be a static polarization separator 210 of FIG. 2 or a dynamic polarization separator 410 of FIG. 4.

Alternately, if the single time division multiplexed laser emits light beams of different wavelengths, then the beams can be separated by a static wavelength separator or a dynamic wavelength separator as described above.

Figure 11:
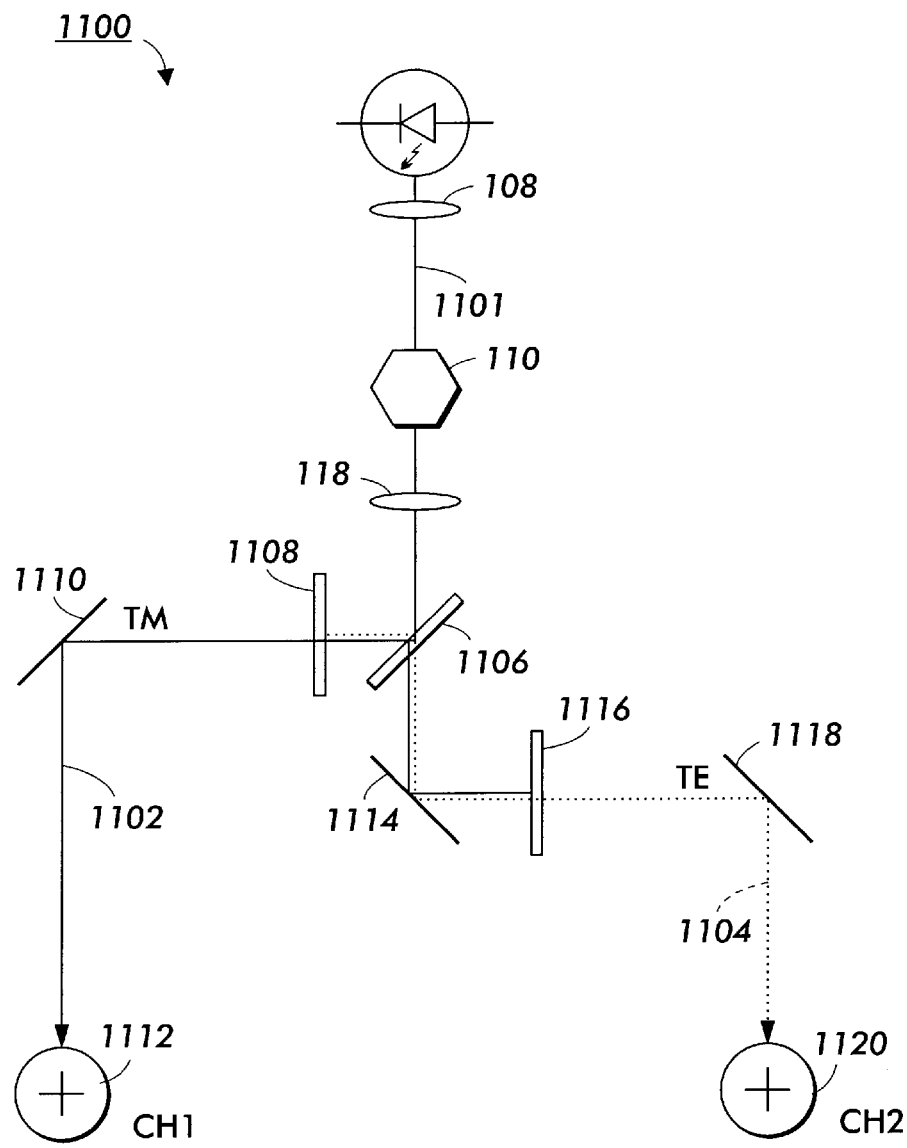
FIG. 11 is a schematic illustration of a single laser beam multiple station printer with beam separators according to an eleventh embodiment of the present invention.

The raster output scanner 100 is used in an tenth embodiment apparatus 1100 as illustrated in FIG. 11. The laser source 104 in response to signals from the electronic signal multiplexer 102 will emit a single polarization switchable beam 1101 at substantially one wavelength.

Since the single beam is time division multiplexed into a cycle having two halves, two beams 1102 and 1104 are shown to scan across two moving photoreceptors. Beam 1102 (containing the data signal of channel 1) is emitted by the single laser having TM-polarization mode in the first half of the cycle and beam 1104 is the second half of the cycle. Beam 1104 (containing the data signal of channel 2) is emitted by the first laser having TE-polarization mode in the second half of the cycle. Only the chief rays are shown.

The apparatus 1100, a multiple station printer, uses the raster output scanner 100, including polygon 110 and optics 118 and laser device 104, to produce the two laser beams 1102 and 1104 (not all components of the raster output scanner 100 are shown in FIG. 10).

Beam 1102 will be written in the first half of the cycle and beam 1104 will be written in the second half of the cycle sequentially to the beam 1 102 in the first half.

Beams 1102 is first input to a 50/50 beam splitter 1106 in the first half of the duty cycle. A portion of the TM-polarized beam 1102 will be reflected by the beamsplitter 1106 to a first polarization separator 1108. The beam 1102 will be transmitted by the separator 1108 and reflected from static mirror 1110 to the first photoreceptor 1112. The other portion of the TM-polarized beam 1102 will be transmitted by the beamsplitter 1106 to be reflected from static mirror 1114 and be blocked by the second polarization separator 1116. The term "blocked" in embodiment 1100 can mean blocked or transmitted away from the photoreceptor or reflected away from the photoreceptor.

Beam 1104 is then input to the 50/50 beamsplitter 1106 in the second half of the duty cycle. A portion of the TE-polarized beam 608 will be reflected by the beamsplitter 1106 to be blocked by the first polarization separator 1108. The other portion of the TE-polarized beam 1104 will be transmitted by the beamsplitter 1106 to be reflected from static mirror 1114 to the the second polarization separator 1116. The beam 1104 will be transmitted by the separator 1116 and reflected from static mirror 1118 to the second photoreceptor 1120.

The polarization separators 1108 and 1116 can be a static polarization separator 210 of FIG. 2 or a dynamic polarization separator 410 of FIG. 4 or a polarization filter or a dynamic shutter 516 in FIG. 5.

Alternately, if the single time division multiplexed laser emits light beams of different wavelengths, then the beams can be separated by a static wavelength separator or a dynamic wavelength separator or a wavelength bandpass filter as described above.

The above described methods and apparatuses are particularly advantageous when combined with other sections of a xerographic printer. Such other sections include, for example, a photoreceptive belt or drum, means for moving the photoreceptor, means for charging the photoreceptor, means for forming a latent image on the photoreceptor, means for transferring the latent image to paper, means for erasing the latent image from the photoreceptor, means for cleaning the photoreceptor, paper transport means, and means for fusing the image onto the paper.

The number of different lasers required for the multiple beam raster output scanning system is reduced by the number of cycles used to print equivalently on all photoreceptors. The complexity of the semiconductor laser source is significantly reduced, especially in the arrangement of the electrical contacts required to separately address each laser in the array. The field of view of the ROS optics is significantly reduced since the physical extent of the laser array is decreased.

A single time division multiplexed laser source, which is rapidly and independently addressable, emits two beams of different polarizations or different wavelengths which are coincident. This laser source simplifies the optical system of the raster output scanning system and the modulation scheme. Alternatively one laser can be used to write on all stations of the printer.

Since both beams are emitted from the same aperture, registration between the two positions is very good.

On the other hand, the peak power required from each laser is increased since each pixel time is effectively reduced by the number of cycles. The average power required from each laser is multiple by the number of cycles since each laser is printing two or more channels. However, the requisite power increases are well within current semiconductor structure technology.

The clock rate for the system is multiplied by the number of cycles and consequently the electronics must be appropriately fast. However, the needed electronics are well within current semiconductor structure technology.

Pixel placement at multiplexed positions may need tangential compensation to correct for the non-simultaneous emission of the pixels from the same laser. A parallel plate may be used to move the appropriate pixel tangentially or unequal path lengths to the multiplexed positions may be used to achieve simultaneous exposures on the photoreceptor (s).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed:

1. A raster output scanner, comprising:
    time division multiplexing means for producing at least two coaxially overlapping laser beams on a first optical path, each of said beams having at least two channels of data signals per cycle of said time division multiplexing;
    means for sweeping said at least two coaxially overlapping laser beams onto a second optical path; and
    beam separating means for directing each of said at least two channels of said at least two laser beams onto a different one of at least four different optical paths.

2. The raster output scanner according to claim 1, wherein said at least two laser beams are orthogonally polarized.

3. The raster output scanner according to claim 2, wherein further including at least four photoreceptor means, one for each of said at least four optical paths, each of said photoreceptor means for receiving one of said channels from said laser beams and for creating a image in response to said laser beam.

4. The raster output scanner according to claim 2, wherein said at least two laser beams are from a single laser package.

5. The raster output scanner according to claim 2, wherein said directing is synchronous with said time division multiplexing.

6. The raster output scanner according to claim 2, wherein said beam separating means comprises at least one dynamic reflector.

7. The raster output scanner according to claim 2, wherein said beam separating means comprises at least one dynamic polarization separator.

8. The raster output scanner according to claim 2, wherein said beam separating means comprises at least one dynamic shutter.

9. The raster output scanner according to claim 1, wherein said at least two laser beams have different wavelengths.

10. The raster output scanner according to claim 9, wherein further including at least four photoreceptor means, one for each of said at least four optical paths, each of said photoreceptor means for receiving one of said channels from said laser beams and for creating a image in response to said laser beam.

11. The raster output scanner according to claim 9, wherein said at least two laser beams are from a single laser package.

12. The raster output scanner according to claim 9, wherein said directing is synchronous with said time division multiplexing.

13. The raster output scanner according to claim 9, wherein said beam separating means comprises at least one dynamic reflector.

14. The raster output scanner according to claim 9, wherein said beam separating means comprises at least one dynamic polarization separator.

15. The raster output scanner according to claim 9, wherein said beam separating means comprises at least one dynamic shutter.

16. A raster output scanner, comprising:
    time division multiplexing means for producing at least two coaxially overlapping, orthogonally polarized laser beams on a first optical path, each of said beams having at least two channels of data signals per cycle of said time division multiplexing;
    means for sweeping said at least two coaxially overlapping, orthogonally polarized laser beams onto a second optical path; and
    a static polarization separator disposed on said second optical path, said static polarization separator for directing said at least two coaxially overlapping, orthogonally polarized laser beams onto either a third optical path or a fourth optical path, and
    a first and second dynamic beam separator, said first dynamic beam separator for directing said laser beam having a first channel of data signals to a first photoreceptor and for directing said laser beam having a second channel of data signals to a second photoreceptor, said second dynamic beam separator for directing said laser beam having a third channel of data signals to a third photoreceptor and for directing said laser beam having a fourth channel of data signals to a fourth photoreceptor.

17. The raster output scanner according to claim 16, wherein said at least two laser beams are from a single laser package.

18. The raster output scanner according to claim 16, further comprising a third and fourth dynamic beam separator, said third dynamic beam separator for directing said laser beam having a fifth channel of data signals to a fifth photoreceptor and for directing said laser beam having a first channel of data signals and said laser beam having a second channel of data signals to said first dynamic beam separator, said fourth dynamic beam separator for directing said laser beam having a sixth channel of data signals to a sixth photoreceptor and for directing said laser beam having a third channel of data signals and said laser beam having a fourth channel of data signals to said second dynamic beam separator.

19. The raster output scanner according to claim 18, wherein said at least two laser beams are from a single laser package.

20. A raster output scanner, comprising:
    time division multiplexing means for producing at least two coaxially overlapping, orthogonally polarized laser beams on a first optical path, each of said beams having at least two channels of data signals per cycle of said time division multiplexing;
    means for sweeping said at least two coaxially overlapping, orthogonally polarized laser beams onto a second optical path; and
    a dynamic beam separator disposed on said second optical path, said dynamic beam separator for either simultaneously directing said at least two coaxially overlapping, orthogonally polarized laser beams onto a third optical path or simultaneously directing said at least two coaxially overlapping, orthogonally polarized laser beams onto a fourth optical path, and a first and second static polarization separator, said first static polarization separator for directing said laser beam having a first channel of data signals to a first photoreceptor and for directing said laser beam having a second channel of data signals to a second photoreceptor, said second static polarization separator for directing said laser beam having a third channel of data signals to a third photoreceptor and for directing said laser beam having a fourth channel of data signals to a fourth photoreceptor.

21. The raster output scanner according to claim 20, wherein said at least two laser beams are from a single laser package.

22. The raster output scanner according to claim 20, further comprising a second dynamic beam separator, said second dynamic beam separator for directing said laser beam having said first channel of data signals, said laser beam having said second channel of data signals, said laser beam having said third channel of data signals, and said laser beam having said fourth channel of data signals to said first dynamic beam separator, and for directing a laser beam having a fifth channel of data signals and a laser beam having a sixth channel of data signals to a third static polarization separator, said third static polarization separator for directing said laser beam having a fifth channel of data signals to a fifth photoreceptor and for directing said laser beam having a sixth channel of data signals to a sixth photoreceptor.

23. The raster output scanner according to claim 22, wherein said at least two laser beams are from a single laser package.

24. A raster output scanner, comprising:

time division multiplexing means for producing at least two coaxially overlapping, orthogonally polarized laser beams on a first optical path, each of said beams having at least two channels of data signals per cycle of said time division multiplexing;

means for sweeping said at least two coaxially overlapping, orthogonally polarized laser beams onto a second optical path; and a dynamic polarization separator disposed on said second optical path, said dynamic polarization separator for directing said at least two coaxially overlapping, orthogonally polarized laser beams onto either a third optical path or a fourth optical path, and a first and second static polarization separator, said first static polarization separator for directing said laser beam having a first channel of data signals to a first photoreceptor and for directing said laser beam having a second channel of data signals to a second photoreceptor, said second static polarization separator for directing said laser beam having a third channel of data signals to a third photoreceptor and for directing said laser beam having a fourth channel of data signals to a fourth photoreceptor.

25. The raster output scanner according to claim 24, wherein said at least two laser beams are from a single laser package.

26. A raster output scanner, comprising:

time division multiplexing means for producing at least two coaxially overlapping, orthogonally polarized laser beams on a first optical path, each of said beams having at least two channels of data signals per cycle of said time division multiplexing;

means for sweeping said at least two coaxially overlapping, orthogonally polarized laser beams onto a second optical path;

a static polarization separator disposed on said second optical path, said static polarization separator for directing said at least two coaxially overlapping, orthogonally polarized laser beams onto either a third optical path or a fourth optical path, and at least a first and second beam splitter, said first beam splitter for directing said laser beam having a first channel of data signals and said laser beam having a second channel of data signals to a first dynamic shutter for transmitting only said laser beam having said first channel of data signals to a first photoreceptor and for directing said laser beam having a second channel of data signals and said laser beam having a first channel of data signals to a second dynamic shutter for transmitting only said laser beam having said second channel of data signals to a second photoreceptor, said second beam splitter for directing said laser beam having a third channel of data signals and said laser beam having a fourth channel of data signals to a third dynamic shutter for transmitting only said laser beam having said third channel of data signals to a third photoreceptor and for directing said laser beam having a fourth channel of data signals and said laser beam having a third channel of data signals to a fourth dynamic shutter for transmitting only said laser beam having said fourth channel of data signals to a fourth photoreceptor.

27. The raster output scanner according to claim 26, wherein said at least two laser beams are from a single laser package.

28. A raster output scanner, comprising:

time division multiplexing means for producing at least two coaxially overlapping, orthogonally polarized laser beams on a first optical path, each of said beams having at least two channels of data signals per cycle of said time division multiplexing;

means for sweeping said at least two coaxially overlapping, orthogonally polarized laser beams onto a second optical path; and a beam splitter disposed on said second optical path, said beam splitter for directing said at least two coaxially overlapping, orthogonally polarized laser beams onto a third optical path and a fourth optical path, a first and second dynamic beam shutter, said first dynamic beam shutter on said third optical path for directing said laser beam having a first channel of data signals and said laser beam having a second channel of data signals to a first static polarization separator, said second dynamic beam shutter on said fourth optical path for directing said laser beam having a third channel of data signals and said laser beam having a fourth channel of data signals to a second static polarization separator, and said first and second static polarization separator, said first static polarization separator for directing said laser beam having a first channel of data signals to a first photoreceptor and for directing said laser beam having a second channel of data signals to a second photoreceptor, said second static polarization separator for directing said laser beam having a third channel of data signals to a third photoreceptor and for directing said laser beam having a fourth channel of data signals to a fourth photoreceptor.

29. The raster output scanner according to claim 28, wherein said at least two laser beams are from a single laser package.

30. A raster output scanner, comprising:

time division multiplexing means for producing at least two coaxially overlapping, dissimilar wavelength laser beams on a first optical path, each of said beams having at least two channels of data signals per cycle of said time division multiplexing;

means for sweeping said at least two coaxially overlapping, dissimilar wavelength laser beams onto a second optical path; and a static wavelength separator disposed on said second optical path, said static wavelength separator for directing said at least two coaxially overlapping, dissimilar wavelength laser beams onto either a third optical path or a fourth optical path, and a first and second dynamic beam separator, said first dynamic beam separator for directing said laser beam having a first channel of data signals to a first photoreceptor and for directing said laser beam having a second channel of data signals to a second photoreceptor, said second dynamic beam separator for directing said laser beam having a third channel of data signals to a third photoreceptor and for directing said laser beam having a fourth channel of data signals to a fourth photoreceptor.

31. The raster output scanner according to claim 30, wherein said at least two laser beams are from a single laser package.

32. The raster output scanner according to claim 30, further comprising a third and fourth dynamic beam separator, said third dynamic beam separator for directing said laser beam having a fifth channel of data signals to a fifth photoreceptor and for directing said laser beam having a first channel of data signals and said laser beam having a second channel of data signals to said first dynamic beam separator, said fourth dynamic beam separator for directing said laser beam having a sixth channel of data signals to a sixth photoreceptor, and for directing said laser beam having a third channel of data signals and said laser beam having a fourth channel of data signals to said second dynamic beam separator.

33. The raster output scanner according to claim 32, wherein said at least two laser beams are from a single laser package.

34. A raster output scanner, comprising:

time division multiplexing means for producing at least two coaxially overlapping, dissimilar wavelength laser beams on a first optical path, each of said beams having at least two channels of data signals per cycle of said time division multiplexing;

means for sweeping said at least two coaxially overlapping, dissimilar wavelength laser beams onto a second optical path; and a dynamic beam separator disposed on said second optical path, said dynamic beam separator for either simultaneously directing said at least two coaxially overlapping, dissimilar wavelength laser beams onto a third optical path or simultaneously directing said at least two coaxially overlapping, dissimilar wavelength laser beams onto a fourth optical path, and a first and second static wavelength separator, said first static wavelength separator for directing said laser beam having a first channel of data signals to a first photoreceptor and for directing said laser beam having a second channel of data signals to a second photoreceptor, said second static wavelength separator for directing said laser beam having a third channel of data signals to a third photoreceptor and for directing said laser beam having a fourth channel of data signals to a fourth photoreceptor.

35. The raster output scanner according to claim 34, wherein said at least two laser beams are from a single laser package.

36. The raster output scanner according to claim 34, further comprising a second dynamic beam separator, said second dynamic beam separator for directing said laser beam having said first channel of data signals, said laser beam having said second channel of data signals, said laser beam having said third channel of data signals, and said laser beam having said fourth channel of data signals to said first dynamic beam separator, and for directing a laser beam having a fifth channel of data signals and a laser beam having a sixth channel of data signals to a third static wavelength separator, said third static wavelength separator for directing said laser beam having a fifth channel of data signals to a fifth photoreceptor and for directing said laser beam having a sixth channel of data signals to a sixth photoreceptor.

37. The raster output scanner according to claim 36, wherein said at least two laser beams are from a single laser package.

38. A raster output scanner, comprising:

time division multiplexing means for producing at least two coaxially overlapping, dissimilar wavelength laser beams on a first optical path, each of said beams having at least two channels of data signals per cycle of said time division multiplexing;

means for sweeping said at least two coaxially overlapping, dissimilar wavelength laser beams onto a second optical path; and a dynamic wavelength separator disposed on said second optical path, said dynamic wavelength separator for directing said at least two coaxially overlapping, dissimilar wavelength laser beams onto either a third optical path or a fourth optical path, and a first and second static wavelength separator, said first static wavelength separator for directing said laser beam having a first channel of data signals to a first photoreceptor and for directing said laser beam having a second channel of data signals to a second photoreceptor, said second static wavelength separator for directing said laser beam having a third channel of data signals to a third photoreceptor and for directing said laser beam having a fourth channel of data signals to a fourth photoreceptor.

39. The raster output scanner according to claim 38, wherein said at least two laser beams are from a single laser package.

40. A raster output scanner, comprising:

time division multiplexing means for producing at least two coaxially overlapping, dissimilar wavelength laser beams on a first optical path, each of said beams having at least two channels of data signals per cycle of said time division multiplexing;

means for sweeping said at least two coaxially overlapping, dissimilar wavelength laser beams onto a second optical path; and a static wavelength separator disposed on said second optical path, said static wavelength separator for directing said at least two coaxially overlapping, dissimilar wavelength laser beams onto either a third optical path or a fourth optical path, and at least a first and second beam splitter, said first beam splitter for directing said laser beam having a first channel of data signals and said laser beam having a second channel of data signals to a first dynamic shutter for transmitting only said laser beam having said first channel of data signals to a first photoreceptor and for directing said laser beam having a second channel of data signals and said laser beam having a first channel of data signals to a second dynamic shutter for transmitting only said laser beam having said second channel of data signals to a second photoreceptor, said second beam splitter for directing said laser beam having a third channel of data signals and said laser beam having a fourth channel of data signals to a third dynamic shutter for transmitting only said laser beam having said third channel of data signals to a third photoreceptor and for directing said laser beam having a fourth channel of data signals and said laser beam having a third channel of data signals to a fourth dynamic shutter for transmitting only said laser beam having said fourth channel of data signals to a fourth photoreceptor.

41. The raster output scanner according to claim 40, wherein said at least two laser beams are from a single laser package.

42. A raster output scanner, comprising:

time division multiplexing means for producing at least two coaxially overlapping, dissimilar wavelength laser beams on a first optical path, each of said beams having at least two channels of data signals per cycle of said time division multiplexing;

means for sweeping said at least two coaxially overlapping, dissimilar wavelength laser beams onto a second optical path; and a beam splitter disposed on said second optical path, said beam splitter for directing said at least two coaxially overlapping, dissimilar wavelength laser beams onto a third optical path and a fourth optical path, a first and second dynamic beam shutter, said first dynamic beam shutter on said third optical path for directing said laser beam having a first channel of data signals and said laser beam having a second channel of data signals to a first static wavelength separator, said second dynamic beam shutter on said fourth optical path for directing said laser beam having a third channel of data signals and said laser beam having a fourth channel of data signals to a second static wavelength separator, and said first and second static wavelength separator, said first static wavelength separator for directing said laser beam having a first channel of data signals to a first photoreceptor and for directing said laser beam having a second channel of data signals to a second photoreceptor, said second static wavelength separator for directing said laser beam having a third channel of data signals to a third photoreceptor and for directing said laser beam having a fourth channel of data signals to a fourth photoreceptor.

43. The raster output scanner according to claim 42, wherein said at least two laser beams are from a single laser package.

44. A raster output scanner, comprising:

time division multiplexing means for producing a modulated laser beam on a first optical path, said modulated laser beam having at least two channels of data signals per cycle of said time division multiplexing;

means for sweeping said modulated laser beam onto a second optical path; and at least one beam separator disposed on said second optical path, said beam separator for directing one of said at least two channels of said modulated laser beam onto a different one of at least two different optical paths.

45. The raster output scanner according to claim 44, wherein portions of said modulated laser beam is orthogonally polarized during said cycle.

46. The raster output scanner according to claim 45, wherein further including at least two photoreceptor means, one for each of said at least two optical paths, each of said photoreceptor means for receiving one of said channels from said laser beam and for creating a image in response to said laser beam.

47. The raster output scanner according to claim 44, wherein said directing is synchronous with said time division multiplexing.

48. The raster output scanner according to claim 44, wherein said beam separating means comprises at least one dynamic polarization separator.

49. The raster output scanner according to claim 44, wherein said beam separating means comprises at least one static polarization separator.

50. The raster output scanner according to claim 44, wherein portions of said modulated laser beam have different wavelengths.

51. The raster output scanner according to claim 50, wherein said beam separating means comprises at least one dynamic wavelength separator.

52. The raster output scanner according to claim 50, wherein said beam separating means comprises at least one static wavelength separator.

53. A raster output scanner, comprising:

time division multiplexing means for producing a modulated laser beam on a first optical path, said modulated laser beam having at least two channels of data signals per cycle of said time division multiplexing;

means for sweeping said modulated laser beam onto a second optical path;

a beam splitter disposed on said second optical path, said beam splitter for directing said at least two coaxially overlapping, orthogonally polarized laser beams onto a third optical path and a fourth optical path, at least a first beam separator disposed on said third optical path, said at least a first beam separator for directing one of said at least two channels of said modulated laser beam onto a different one of at least two different optical paths, and at least a second beam separator disposed on said fourth optical path, said at least a second beam separator for directing one of said at least two channels of said modulated laser beam onto a different one of at least two different optical paths.

54. The raster output scanner according to claim 53, wherein portions of said modulated laser beam is orthogonally polarized during said cycle.

55. The raster output scanner according to claim 54, wherein further including at least two photoreceptor means, one for each of said at least two optical paths, each of said photoreceptor means for receiving one of said channels from said laser beam and for creating a image in response to said laser beam.

56. The raster output scanner according to claim 53, wherein said directing is synchronous with said time division multiplexing.

57. The raster output scanner according to claim 53, wherein said beam separating means comprises at least one dynamic polarization separator.

58. The raster output scanner according to claim 53, wherein said beam separating means comprises at least one static polarization separator.

59. The raster output scanner according to claim 53, wherein said beam separating means comprises at least one dynamic shutter.

60. The raster output scanner according to claim 53, wherein said beam separating means comprises at least one polarization filter.

61. The raster output scanner according to claim 53, wherein said wherein portions of said modulated laser beam have different wavelengths.

62. The raster output scanner according to claim 61, wherein said beam separating means comprises at least one dynamic wavelength separator.

63. The raster output scanner according to claim 61, wherein said beam separating means comprises at least one static wavelength separator.

64. The raster output scanner according to claim 61, wherein said beam separating means comprises at least one bandpass filter.

* * * * *